US011770442B2

(12) United States Patent
Lee et al.

(10) Patent No.: US 11,770,442 B2
(45) Date of Patent: Sep. 26, 2023

(54) ELECTRONIC DEVICE FOR PERFORMING EDGE COMPUTING SERVICE AND METHOD FOR THE SAME

(71) Applicant: Samsung Electronics Co., Ltd., Suwon-si (KR)

(72) Inventors: Wonbo Lee, Suwon-si (KR); Jinhyoung Kim, Suwon-si (KR); Sangcheol Lee, Suwon-si (KR); Youngwook Kim, Suwon-si (KR); Taewan Kim, Suwon-si (KR); Hongshik Kim, Suwon-si (KR); Ansik Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 17/220,734

(22) Filed: Apr. 1, 2021

(65) Prior Publication Data

US 2021/0314391 A1 Oct. 7, 2021

Related U.S. Application Data

(60) Provisional application No. 63/003,389, filed on Apr. 1, 2020.

(30) Foreign Application Priority Data

Jun. 15, 2020 (KR) ........................ 10-2020-0072528

(51) Int. Cl.
*H04L 67/1008* (2022.01)
*H04W 48/18* (2009.01)
(Continued)

(52) U.S. Cl.
CPC ...... *H04L 67/1008* (2013.01); *H04L 67/1012* (2013.01); *H04L 67/51* (2022.05); *H04W 48/18* (2013.01); *H04W 72/56* (2023.01)

(58) Field of Classification Search
CPC . H04L 67/1008; H04L 67/1012; H04W 48/18
See application file for complete search history.

(56) References Cited

U.S. PATENT DOCUMENTS 7,512,707 B1 * 3/2009 Manapragada ..... H04L 67/1008 709/240
2010/0094950 A1 * 4/2010 Zuckerman ......... H04L 67/1008 709/213
(Continued)

FOREIGN PATENT DOCUMENTS

EP 4149072 A1 3/2023
JP H09-200346 A 7/1997
(Continued)

OTHER PUBLICATIONS

"3rd Generation Partnership Project; Technical Specification Group Services and System Aspects; Study on application architecture for enabling Edge Applications; (Release 17)", 3GPP TR 23.758 V17.0.0 (Dec. 2019), 113 pages.
(Continued)

*Primary Examiner* — Kristie D Shingles

(57) ABSTRACT

An electronic device includes a memory, a communication circuit, and a processor. The memory is configured to store an application and an edge enabler client. The communication circuit is configured to communicate with at least one of a first server, a second server, or a third server. The application is configured to perform one or more functions corresponding to the third server. The processor is configured to receive access information for accessing the second server from the first server. The processor is configured to receive access information of the third server from each of a plurality of second servers. The processor is configured to check at least one or more third servers capable of providing a service The processor is configured to select the third server to request access among a plurality of third servers.
(Continued)

The processor is configured to perform the service using the selected third server.

20 Claims, 12 Drawing Sheets

(51) Int. Cl.

| | |
|---|---|
| ***H04L 67/1012*** | (2022.01) |
| ***H04L 67/51*** | (2022.01) |
| ***H04W 72/56*** | (2023.01) |

(56) References Cited

U.S. PATENT DOCUMENTS

| | | | | |
|---|---|---|---|---|
| 2018/0041601 | A1 | 2/2018 | Park et al. | |
| 2020/0389531 | A1 | 12/2020 | Lee et al. | |
| 2021/0136177 | A1* | 5/2021 | Hall | H04L 41/5051 |
| 2021/0144543 | A1 | 5/2021 | Mun et al. | |

FOREIGN PATENT DOCUMENTS

| | | | |
|---|---|---|---|
| KR | 10-2011-0012830 | A | 2/2011 |
| WO | 2020032353 | A1 | 2/2020 |
| WO | 2021225389 | A1 | 11/2021 |

OTHER PUBLICATIONS

"3rd Generation Partnership Project; Technical Specification Group Services and System Aspects; Architecture for enabling Edge Applications; (Release 17)", 3GPP TS 23.558 V0.1.1 (Jan. 2020), 40 pages.

"3rd Generation Partnership Project; Technical Specification Group Services and System Aspects; Study on authentication and key management for applications based on 3GPP credential in 5G (Release 16)", 3GPP TR 33.835 V16.0.0 (Dec. 2019), 83 pages.

"3rd Generation Partnership Project; Technical Specification Group Services and System Aspects; Authentication and key management for applications; based on 3GPP credential in 5G (AKMA) (Release 16)", 3GPP TS 33.535 V0.3.0 (Mar. 2020), 12 pages.

3rd Generation Partnership Project; Technical Specification Group Core Network and Terminals; Numbering, addressing and identification (Release 13), 3GPP TS 23.003 V13.2.0 (Jun. 2015), 93 pages.

International Search Report and Written Opinion of the International Searching Authority dated Jul. 16, 2021 in connection with International Application No. PCT/KR2021/004041, 6 pages.

3GPP TS 23.558 V0.1.2 (Jan. 2020), Technical Specification, 3rd Generation Partnership Project; Technical Specification Group Services and System Aspects; Architecture for enabling Edge Applications; (Release 17), Jan. 2020, 40 pages.

European Patent Office, "Supplementary European Search Report," dated Jun. 13, 2023, in connection with European Patent Application No. 21780150.5, 15 pages.

* cited by examiner

ELECTRONIC DEVICE FOR PERFORMING EDGE COMPUTING SERVICE AND METHOD FOR THE SAME

CROSS-REFERENCE TO RELATED APPLICATIONS

This application is based on and claims the benefit of U.S. Provisional Patent Application No. 63/003,389 filed on Apr. 1, 2020, in the U.S. Patent and Trademark Office and Korean Patent Application No. 10-2020-0072528 filed on Jun. 15, 2020 in the Korean Intellectual Property Office, the disclosures of which are herein incorporated by reference in their entirety.

BACKGROUND

1. Field

Various embodiments relates to an electronic device and a method of operating the electronic device and, more particularly, to an electronic device that performs edge computing service.

2. Description of Related Art

As various electronic devices such as smart phones, tablet PCs, portable multimedia players PMI's, personal digital assistants PDAs, laptop personal computers laptop PCs, and wearable devices are becoming more widespread, various wireless communication technologies are being developed that are used for various electronic devices to perform communication.

Efforts are being made to develop 5G communication systems in order to meet the increasing demand for wireless data traffic after commercialization of 4G communication systems. For this reason, the 5G communication system is called Beyond 4G Network communication system or Post-LTE system. In order to achieve a high data rate, in addition to the band below 6G system, the 5G communication system is also being considered for implementation in a higher frequency band (e.g., such as a 60 Giga (60 GHz) band). In 5G communication systems, beamforming, massive MIMO, Full Dimensional MIMO (FD-MIMO), array antenna, analog beam-forming, and large scale antenna technologies are being discussed.

In the 5G communication system, various techniques have been proposed and are being implemented in order to implement a reduction in transmission time or a reduction in delay time. Among the technologies implemented, edge computing service is a technology that implements an edge network system in an area close to a base station, and an electronic device connected to the base station can receive various services using an edge network system implemented in an area close to the base station. The edge computing service can reduce the distance between the user's electronic device and the network.

The above information is presented as background information only to assist with an understanding of the disclosure. No determination has been made, and no assertion is made, as to whether any of the above might be applicable as prior art with regard to the disclosure.

SUMMARY

An electronic device capable of performing an edge computing service may select a server capable of providing an edge computing service when there are a plurality of servers capable of providing the same edge computing service. The electronic device does not have a technology for determining which server to select among a plurality of servers. The electronic device may select a server that provides a relatively low-quality service instead of a server that can provide a relatively high-quality service.

An electronic device capable of performing an edge computing service may search for a server capable of providing an edge computing service through an edge service discovery procedure. When a server that is not instantiated is searched, there may be a phenomenon in which it is difficult for the electronic device to determine whether an instantiated server has been detected, and further, there may be a phenomenon in which the electronic device cannot perform the edge computing service because there is no specific technology for activating the deactivated server.

There is no specific description of how to update the access information when the access information of the server capable of providing the edge computing service has expired. Accordingly, when an electronic device capable of performing an edge computing service has expired access information of a server capable of providing an edge computing service, a phenomenon in which it cannot access the server may occur by using the un-updated access information.

An electronic device according to various embodiments may include a memory configured to store an application and/or an edge enabler client (EEC), a communication circuit for use in a communication connection between the electronic device and a first server, a second server, and/or a third server existing outside the electronic device through a base station, and a processor, wherein the application may be configured to perform one or more functions corresponding to an application that can be executed on the third server on the electronic device, and the processor may be configured to: receive access information of the second server for accessing the second server from the first server; receive access information of the third server from each of a plurality of second servers accessed based on the access information of the second server; check at least one or more third servers capable of providing the service, based on access information of the third server, in response to a service connection request using the third server of the application; select a third server to request access among the plurality of third servers, based on the priority of the plurality of second servers included in the access information of the second server, in response to checking that there are a plurality of third servers capable of providing the service; and perform the service using the selected third server.

An electronic device according to various embodiments may include: a memory configured to store an application and/or an edge enabler client (EEC); a communication circuit for use in a communication connection between the electronic device and a first server, a second server, and/or a third server existing outside the electronic device through a base station; and a processor, wherein the application may be configured to perform one or more functions corresponding to an application that can be executed on the third server on the electronic device, and the processor may be configured to: receive access information of the second server for accessing the second server from the first server; transmit an edge service discovery request message requesting access information of the third server to the second server, based on the access information of the second server; receive an edge service discovery response message from the second server;

check whether some of the information that is used for accessing the third server is present in the edge service discovery response message, in response to a service connection request using the third server of the application; and transmit a message for activating the third server to the second server in response to checking that some of the information that is used for accessing the third server does not exist in the edge service discovery response message.

An electronic device according to various embodiments may include: a memory configured to store an application and/or an edge enabler client (EEC); a communication circuit for use in a communication connection between the electronic device and a first server, a second server, and/or a third server existing outside the electronic device through a base station; and a processor, wherein the application may be configured to perform one or more functions corresponding to an application that can be executed on the third server on the electronic device, and the processor may be configured to: receive access information of the second server for accessing the second server from the first server; transmit an edge service discovery request message requesting access information of the third server to the second server, based on the access information of the second server; receive access information of the third server from the second server; check whether the access information of the third server has expired, based on time to live (TTL) information included in the access information of the third server, in response to a service connection request using the third server of the application; and transmit the edge service discovery message back to the second server in response to checking that the access information of the third server has expired.

A method of operating an electronic device according to various embodiments may include: receiving access information of a second server for accessing a second server from the first server; receiving access information of a third server from each of a plurality of second servers accessed based on the access information of the second server; checking at least one third server capable of providing the service, based on the access information of the third server, in response to the service connection request using the third server of the application; selecting a third server to request access among the plurality of third servers, based on the priority of the plurality of second servers included in the access information of the second server, in response to checking that there are a plurality of third servers capable of providing the service; and performing the service using the selected third server.

According to an electronic device and a method of operating the electronic device according to various embodiments, a third server to be connected based on priority information of the second server, which is determined based on the performance information of the third server, is selected. Therefore, the electronic device can be connected to a third server having a relatively high performance. Accordingly, the electronic device and the operation method of the electronic device can select a third server capable of providing the highest quality service.

According to an electronic device and a method of operating the electronic device according to various embodiments, the third server may be activated through a method of retransmitting an edge service discovery request message including information capable of indicating a third server in an inactive state. Accordingly, the electronic device and the operating method of the electronic device can reduce a phenomenon in which an edge computing service cannot be performed due to a failure of access to a deactivated third server.

According to an electronic device and a method of operating the electronic device according to various embodiments, the validity of the access information of the third server may be determined based on the expiration time of the access information of the third server. According to an electronic device and a method of operating the electronic device according to various embodiments, if the access information of the third server is not valid, it is possible to receive valid access information of the third server 530 through a method of retransmitting the edge service discovery request message, and to reduce a phenomenon in which an edge computing service cannot be performed due to the use of invalid access information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
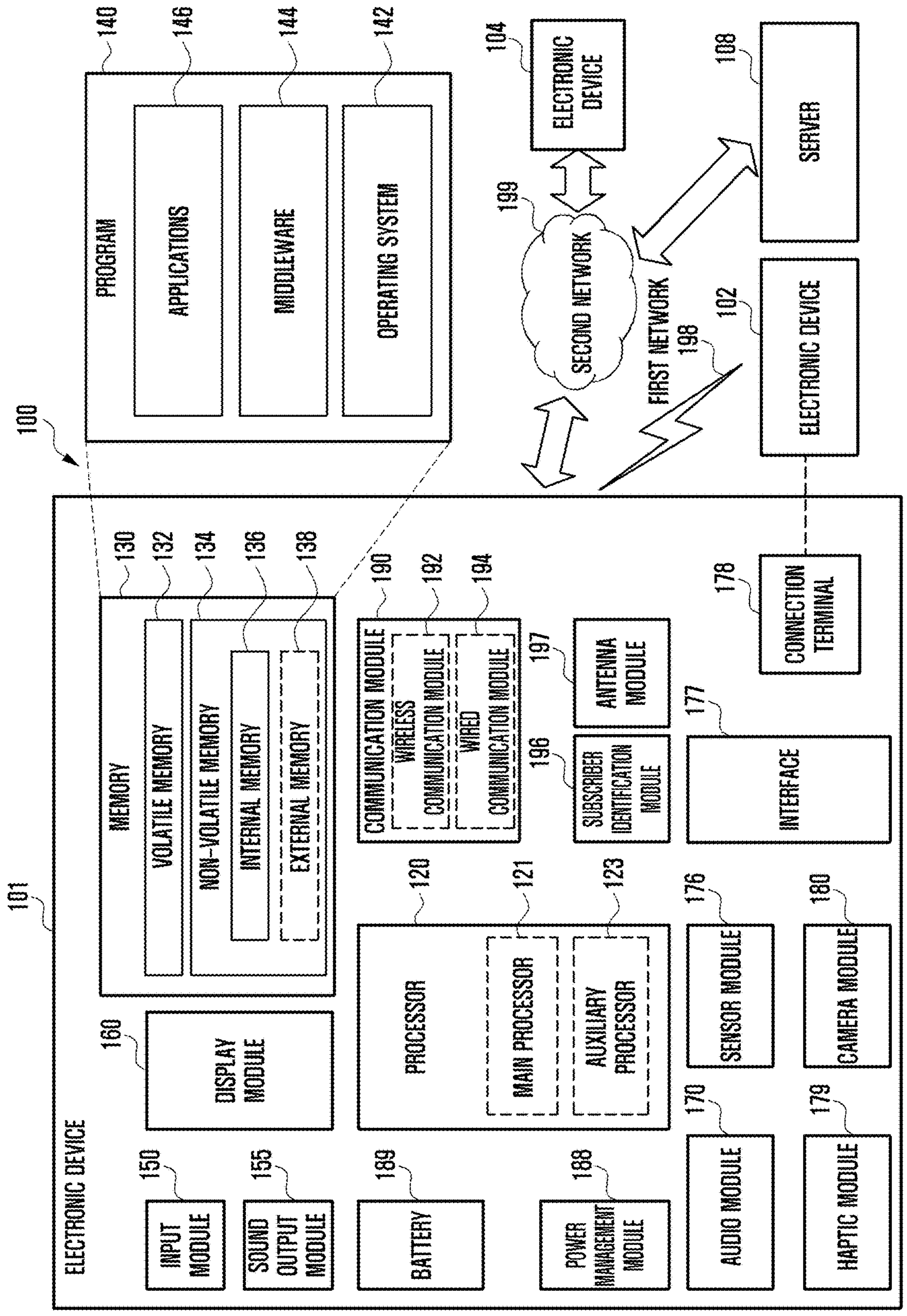
FIG. 1 illustrates a block diagram of an electronic device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
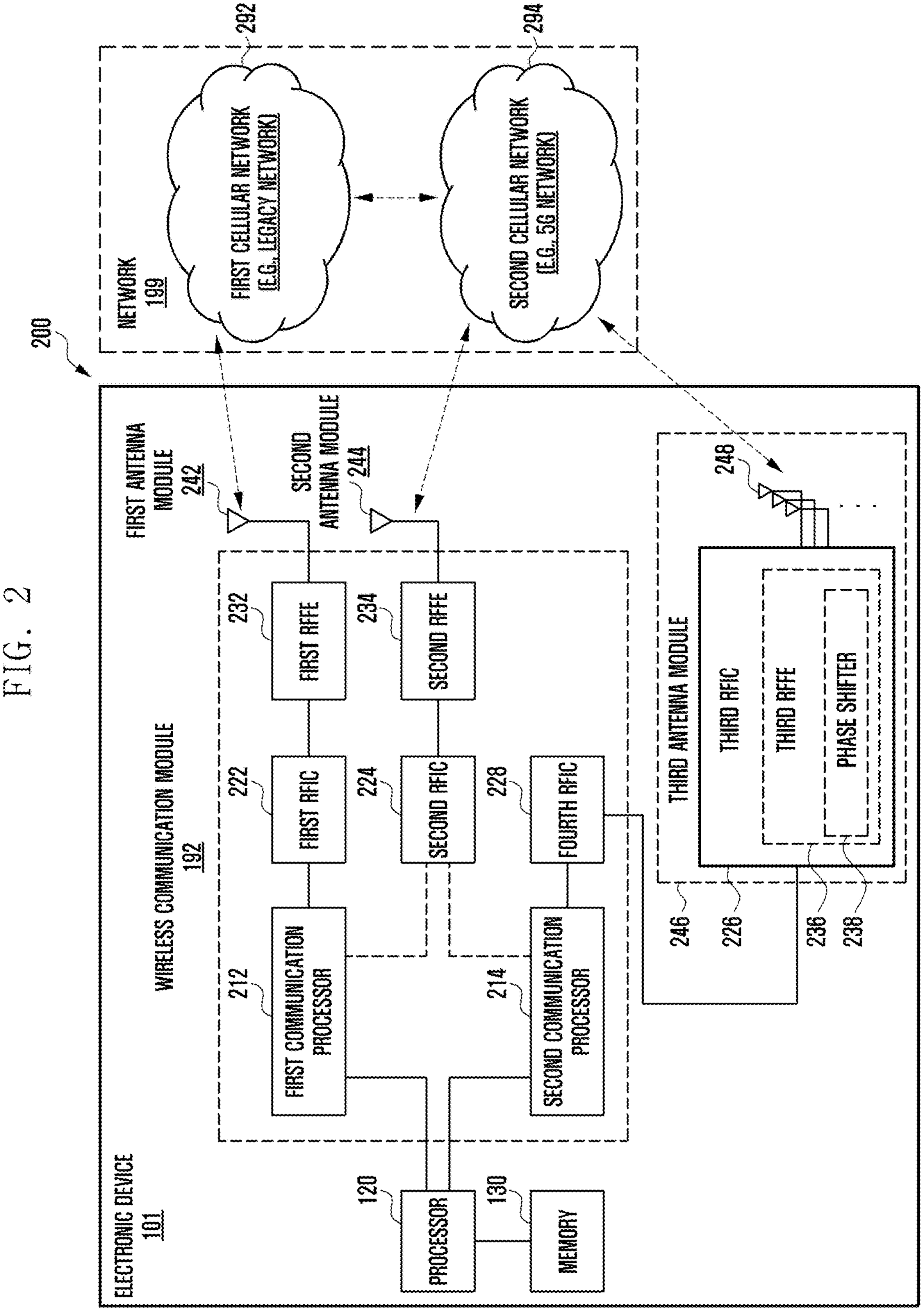
FIG. 2 illustrates a block diagram of an electronic device according to various embodiments.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
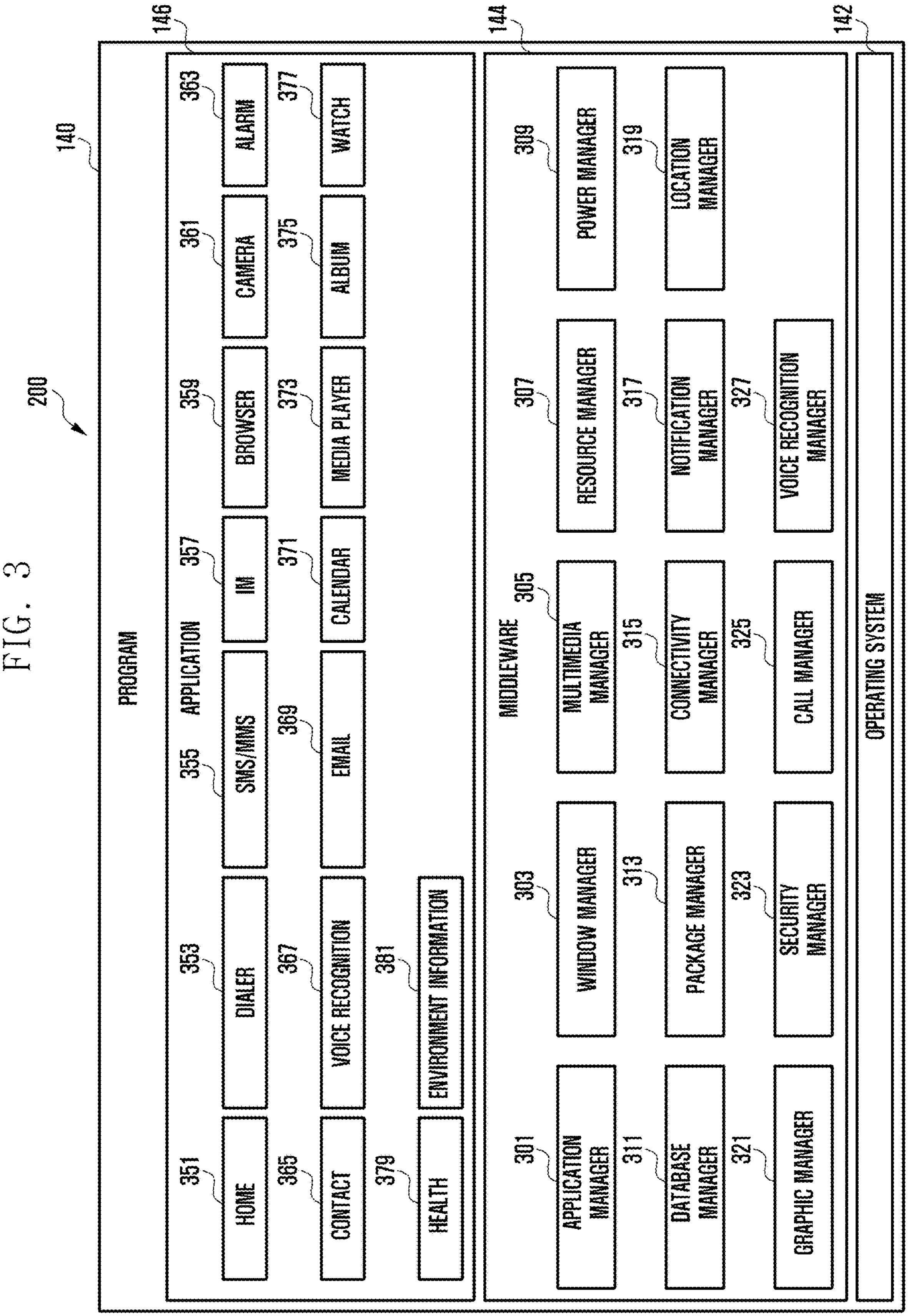
FIG. 3 illustrates a block diagram of a program according to various embodiments.

FIG. 3 is a block diagram 300 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 309 may interwork with a basic input/output system (BIOS) (not shown) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device 101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The application 146 may include, for example, a home 351, dialer 353, short message service (SMS)/multimedia messaging service (MMS) 355, instant message (IM) 357, browser 359, camera 361, alarm 363, contact 365, voice recognition 367, email 369, calendar 371, media player 373, album 375, watch 377, health 379 (e.g., for measuring the degree of workout or biometric information, such as blood sugar), or environmental information 381 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 4:
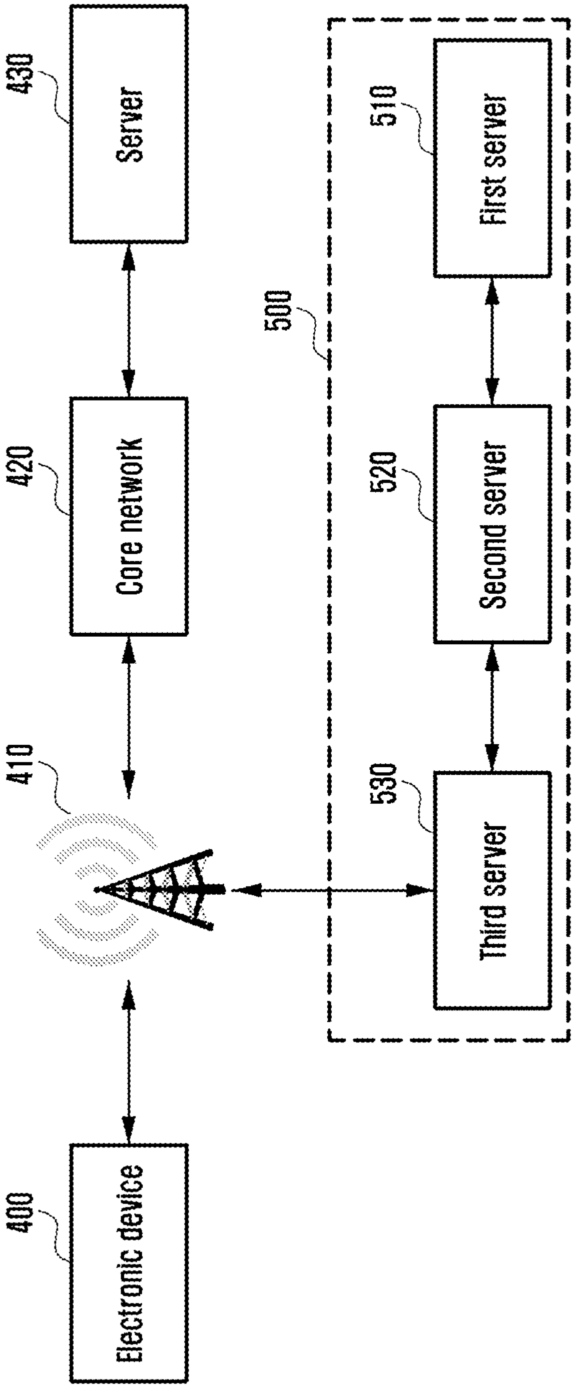
FIG. 4 illustrates a block diagram of a network system according to various embodiments.

FIG. 4 illustrates a block diagram of a network system according to various embodiments of the disclosure.

FIG. 4 illustrates a network system for an electronic device 400 to use an edge network system.

Referring to FIG. 4, according to various embodiments, the network system may include an electronic device (e.g., the electronic device 101 in FIG. 1) 400, a base station 410, a core network 420, and a server 430 and/or an edge network system 500.

The electronic device 400 according to various embodiments may receive data provided by the server 430 through the base station 410 and the core network 420 or transmit data to the server 430. The server 430 may be a server that exists outside (e.g., an Internet network) of a network operated by a cellular communication service provider (e.g., a network including the base station 410 and the core network 420). According to an embodiment, the operating entity of the server 430 may be a provider other than a cellular communication provider.

In various embodiments, the electronic device 400 may transmit or receive control data or user data with the base station 410 while performing cellular communication. The cellular communication refers to any one of various cellular communication methods supported by the electronic device 400. For example, the cellular communication may be one of cellular communication (e.g., long-term evolution (LTE), LTE-advanced (LTE-A), LTE-advanced pro (LTE-A pro) through a first network (e.g., the first network 198 in FIG. 1) or cellular communication (e.g., 5G on below 6 GHz, or 5G on above 6 GHz) through a second network (e.g., the second network 199 of FIG. 1).

According to various embodiments, the base station 410 may be wirelessly connected to the electronic device 400 and wired or wirelessly connected to the core network 420 and/or the edge network system 500, thereby forming a path for data transmission or reception between the electronic device 400 and the core network 420 and/or edge network system 500. The base station 410 may transmit control data or user data transmitted from the core network 420 and/or the edge network system 500 to the electronic device 400. The base station 410 may transmit control data or user data transmitted from the electronic device 400 to the core network 420 and/or the edge network system 500. The control data may refer to data for controlling various operations through the cellular communication of the electronic device 400. The user data may refer to IP data transmitted through the cellular communication of the electronic device 400. For example, the base station 410 may be defined as an eNB (or eNodeB) in a 4G mobile communication method and a gNB (or gNodeB) in a 5G mobile communication method.

According to various embodiments, the core network 420 may perform various functions (e.g., call connection, IP data processing, authentication of the electronic device 400, billing processing of the cellular communication service used by the electronic device 400, mobility management of the electronic device 400, or connection of the electronic device 400 to an external network) using the cellular communication used by the electronic device 400. The core network 420 may be defined as an evolved packet core (EPC) in a 4th generation mobile communication method and a 5G core (5GC) in a 5th generation mobile communication method.

According to various embodiments, the core network 420 supporting 5G mobile communication may support various functions (e.g., edge computing) compared to a core network supporting 4G mobile communication. The edge computing may refer to a technology for performing various services through the edge network system 500 implemented in a location physically close to the electronic device 400 (e.g., a location physically close to the base station 410, or inside the base station 410) in order to implement a high communication speed or a low delay time. Compared to the server 430, the edge network system 500 may be implemented in a location physically close to the electronic device 400, thereby data communication through the edge network system 500 may implement a higher communication speed and/or a lower delay time than data communication through the core network 420. For example, the edge network system 500 may be directly connected to the core network 420 or may be located in a physically close location or within the core network 420.

According to various embodiments, a first server 510 may be a server that provides information on at least one second server 520 to which the electronic device 400 can connect. For example, the information on the second server 520 may include access information (e.g., IP address of the second server 520, access address information of the second server 520 including a domain name of the second server 520 and/or a uniform resource identifier (URI) of the second server 520, and identifier of the second server 520) of the second server 520. The first server 510 may be the same as or similar to the edge data network configuration server (ECS) defined in TS 23.558.

According to various embodiments, the second server 520 may be a server that is connected to a third server 530 and manages various operations of the third server 530. The second server 520 may receive performance information of the third server 530 (e.g., available resources of the third server 530 such as memory capacity or bandwidth) from the third server 530. The second server 520 may transmit information on at least one or more third servers 530 connected to the second server 520 in response to a request of the electronic device 400. The second server 520 may be the same as or similar to the edge enabler server (EES) defined in TS 23.558.

Figure 5:
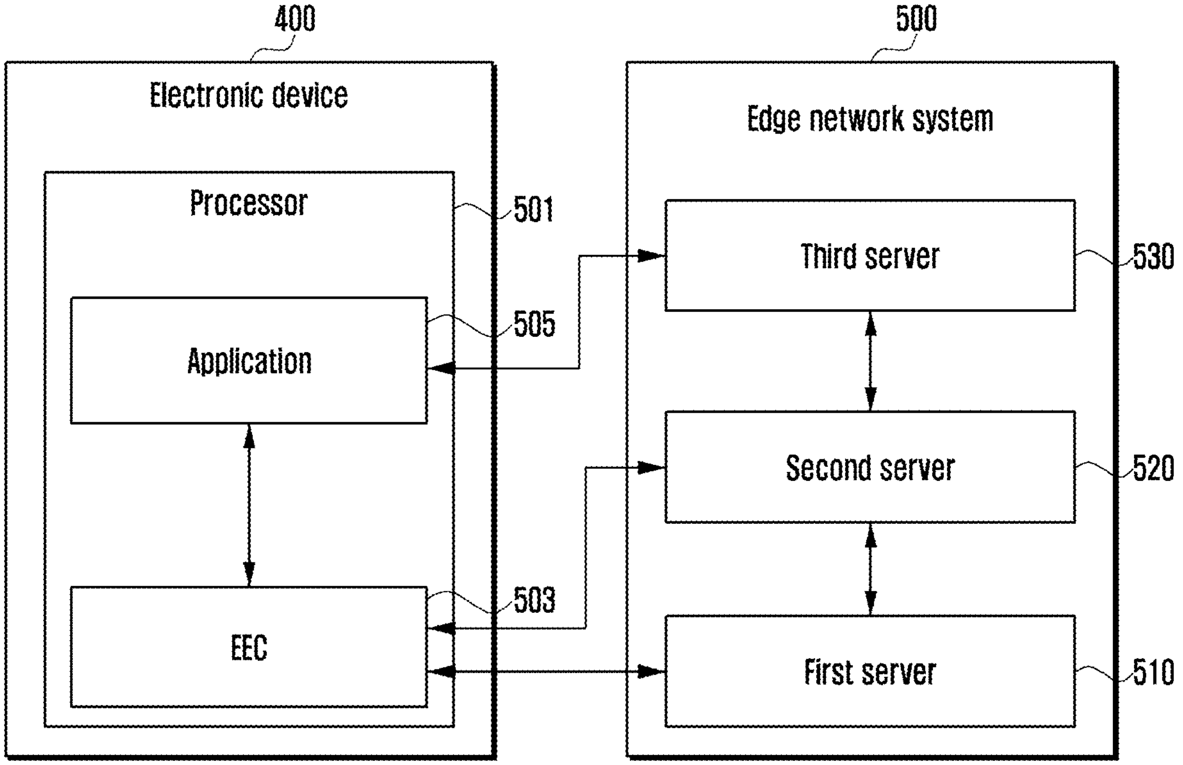
FIG. 5 illustrates a diagram of an electronic device and an edge network according to various embodiments.

According to various embodiments of the disclosure, the third server 530 may be a server that provides an edge computing service that the application 505 installed on the electronic device 400 can use. The third server 530 may provide application data related to an edge computing service to the application 505. The third server 530 may be the same as or similar to the edge application server (EAS) defined in TS 23.558. In FIG. 5, one third server 530 is illustrated, but a plurality of third servers 530 may be arranged according to a service provided. At least one or more third servers 530 within the mobile communication network may be deployed at various locations to provide edge services to user terminals (UEs) in adjacent locations.

According to various embodiments, the electronic device 400 may transmit a signal requesting connection of the first server 510 to the core network 420 for connection of the edge network system 500. The core network 420 may transmit access information of the first server 510 to the electronic device 400 through various procedures (e.g., an authentication operation of the electronic device 400).

According to various embodiments, for convenience of description, the first server 510, the second server 520, and the third server 530 included in the edge network system 500 are all illustrated as being disposed near the base station 410 or the electronic device 400, but the disclosure is not limited thereto, and various arrangements may be possible. For example, the first server 510 and the second server 520 may be connected to or disposed adjacent to the core network (e.g., the core network 420 of FIG. 4), and the third server 530 may be disposed close to the electronic device 400 (e.g., connected to or adjacent to the base station 410). For another example, the first server 510 and the second server 520 may be disposed outside (e.g., an Internet network) a mobile communication network operated by a cellular communication service provider (e.g., a network including the base station 410 and the core network 420), and the third server 530 may be disposed at a location close to the electronic device 400. Alternatively, the first server 510 and the second server 520 may be implemented as an integrated entity. If the edge network system 500 according to various embodiments includes at least one third server 530 disposed closer to an electronic device 400 than an external server 430 and is capable of providing edge services, those skilled in the art will readily understand that the components included in the edge network system 500 can have various configurations.

Various embodiments of a connection operation between the electronic device 400 and the edge network system 500 will be described later with reference to FIG. 5.

FIG. 5 illustrates a diagram of an electronic device and an edge network system according to various embodiments.

According to various embodiments, the edge network system 500 may include a first server 510, a second server 520, and/or a third server 530.

According to various embodiments, the third server 530 may be a server that provides an edge computing service that the application 505 installed in the electronic device 400 can use. The third server 530 may provide application data related to an edge computing service to the application 505. The third server 530 may be the same as or similar to the edge application server (EAS) defined in TS 23.558.

According to various embodiments, the second server 520 may be a server that is connected to the third server 530 and manages various operations of the third server 530. The second server 520 may receive performance information of the third server 530 (e.g., available resources of the third server 530 such as memory capacity or bandwidth) from the third server 530. The second server 520 may transmit information on at least one or more third servers 530 connected to the second server 520 in response to a request of the electronic device 400. The second server 520 may be the same as or similar to the edge enabler server (EES) defined in TS 23.558.

According to various embodiments, the first server 510 may be a server that provides information on at least one second server 520 to which the electronic device 400 can connect. For example, the information on the second server 520 may include access information (e.g., IP address of the second server 520, access address information of the second server 520 including a domain name of the second server 520 and/or a uniform resource identifier (URI) of the second server 520, and identifier of the second server 520) of the second server 520. The first server 510 may be the same as or similar to the edge data network configuration server (ECS) defined in TS 23.558.

According to various embodiments, the electronic device 400 may include a processor (e.g., the processor 120 in FIG. 1) 501 and a memory (e.g., the memory 130 in FIG. 1). The memory 130 may store various program modules executable on the processor 501. The memory 130 may store an application (e.g., an application 146 in FIG. 1) 505 capable of performing a service using an edge network and various components (e.g., edge enabler client, EEC) 503 for supporting edge computing. The processor 501 may load and execute (or operate) various program modules (e.g., EEC 503 and application 505) stored in the memory 130. The EEC 503 may be implemented on an application layer (e.g., the application 146 in FIG. 1), middleware (e.g., the middleware 144 in FIG. 1) and/or an operating system (e.g., the operating system 142 in FIG. 1).

According to various embodiments of the disclosure, the EEC 503 may perform various operations of identifying an application 505 capable of using an edge computing service among various applications executing (or operating) on an electronic device 400 and setting the application to transmit or receive application 505 data to a third server 530.

The EEC 503 may receive access information of the components of the edge network system 500, which enables applications 505 to exchange application data through the edge network system 500 from the edge network system 500, and controls the connection between the edge network system 500 and electronic devices 400, based on the access information. Hereinafter, a specific embodiment for connection between the EEC 503 and the third server 530 is described.

According to various embodiments of the disclosure, the EEC 503 may execute an operation of connecting with the first server 510, based on the access information of the first server 510 received from the core network (e.g., the core network 420 in FIG. 4). In another embodiment, the EEC 503 may execute an operation of connecting with the first server 510, based on the access information of the first server 510 stored on the electronic device (e.g., a memory 130 and/or a SIM card (e.g., a subscriber identification module 196 in FIG. 1)). The EEC 503 may transmit identification information (e.g., an international mobile subscriber identification (IMSI) and/or a generic public subscription identifier (GPSI) of the electronic device 400) of the electronic device 400 to the first server 510, and the first server 510 may perform authentication of the electronic device 400, based on the identification information of the electronic device 400.

According to various embodiments, after the connection with the first server 510 is completed, the EEC 503 may perform a provisioning procedure for an edge service. The provisioning procedure may include transmitting a signal for requesting access information of the second server 520 to the first server 510. The first server 510 may transmit access information of the second server 520 (e.g., the identifier of the second server 520, URI information of the second server 520, domain information of the second server 520, IP address of the second server 520, when there is a dedicated public data network (PDN) or packet data unit (PDU) session of the edge network system 500, at least one of access point name (APN) information and/or data network name (DNN) information corresponding to the dedicated PDN or PDU and/or information (e.g., token) used for verification for valid connection of the second server of the second server 520) to the electronic device 400.

According to various embodiments, the access information of the second server 520 may be the same as or similar to the EES list defined in TS 23.558. For example, the access information of the second server 520 may be implemented as illustrated in Table 1 below and transmitted to the EEC 503. The access information of the second server 520 may include an identifier of the second server 520 and/or access address information (e.g., URI information of the second server 520, domain information of the second server 520, IP address information of the second server 520, if there is a dedicated public data network (PDN) or packet data unit (PDU) session of the edge network system 500, APN (access point name) information corresponding to the dedicated PDN or PDU and/or data network name (DNN) information) of the second server 520.

TABLE 1

| EES Identifier | Access Address Information |
| --- | --- |
| EES 1 | ees1.edge1.com |
| EES 2 | ees2.edge2.com |

According to various embodiments, the EEC 503 may attempt to access the second server 520, based on access information (e.g., EES identifier, access address information) of the second server 520 received from the first server 510. The second server 520 may check whether the electronic device 400 is an electronic device with access authority of the second server 520, based on the access information (e.g., token) of the second server 520 transmitted by the EEC 503, and determine whether to allow access (or connect) to the electronic device 400, based on the result. For example, the second server 520 may receive the token and determine whether to allow the access (or connect) to the second server 520 of the electronic device 400 through an authentication operation using the authentication server (not illustrated) and the received token. In this case, the token may be information transmitted from the authentication server (not illustrated) to the electronic device 400.

According to various embodiments, the EEC 503 may perform an edge service discovery procedure (e.g., a procedure for discovering service information that can be executed in the edge server(s)) for acquiring information on the third server 530 capable of providing an edge computing service to the application 505. The EEC 503 may transmit an edge service discovery request message requesting access information of at least one third server 530 connected to the second server 520 to the second server 520. The second server 520 may transmit an edge service discovery response message including the access information of the third server 530 stored in the second server 520 to the EEC 503.

The access information of the third server 530 may include an identifier (EASID) of the third server 530, an identifier of an application installed on the electronic device 400 (ACID), and/or access address information (e.g., the IP address of the third server 530, the domain name of the third server 530) of the third server 530.

According to various embodiments, the third server 530 may be a software entity that is implemented as a service unit. For example, The plurality of third servers 530 are entities implemented on one physical server, and may be servers that provide different services. In this case, the access information of the third server 530 may include access information of applications that can be executed in the third server 530 and/or identifiers of applications that are installed on the electronic device 400 and can perform a service using the third server 530. The identifier of a service that can be provided by the third server 530 may mean an identifier of an application installed on the third server 530.

According to various embodiments, the access information of the third server 530 may be the same as or similar to the EAS list defined in TS 23.558. The information of the third server 530 may be implemented as illustrated in Table 2 below and transmitted to the EEC 503.

TABLE 2

| Identifier of third server | Identifier of application executed on electronic device (ACID) | Access address information |
| --- | --- | --- |
| EAS1 | com.android.app1 | ees1.edge1.com |
| EAS2 | com.android.app2 | 2.2.2.2 |
| EAS3 | com.android.app3 | ees3.edge3.com/3.3.3.3 |

The access information of the third server 530 in Table 2 may include an identifier of the third server 530 and/or an identifier (ACID) of an application executed on the electronic device 400. For example, each row of Table 2 (e.g., EAS1, EAS2, EAS3, etc.) may refer to an identifier and access address for a first server application and a second server application that can be executed in the third server 530.

According to various embodiments, the identifier of the third server 530 may be an identifier of an application executed on the third server 530, and may be a value distinguished for each service application that can be executed on the third server 530. When there are a plurality of service applications that can be executed in the third server 530, the third server 530 may have identifiers of the plurality of third servers 530. When there is one service application that can be executed on the third server 530, the third server 530 may have one third server 530 identifier, and the identifier of the third server 530 may be used interchangeably as an identifier of an application running on the third server 530.

According to various embodiments, in response to reception of a service connection request using the third server 530 of the application 505, the EEC 503 may search for a third server 530 capable of providing a service that can be used by the application 505 from the access information of the third server 530. The EEC 503 may check an application identifier (e.g., com.android.app1) that matches the application identifier (e.g., com.android.app1) to be used by the application 505 among the application identifiers (e.g., com.android.app1, com.android.app2) included in the identifier of the third server 530, and transmit the domain name (e.g., app1.edge.com) or IP address (e.g., 3.3.3.1) of the third server 530 corresponding to the identified application identifier (e.g., com.android.app1) to the application 505. The application 505 may connect with the third server 530, based on the received domain name or IP address of the third server 530, and perform a service using the third server 530.

In FIG. 5, although the processor 501 and/or the application 505 are illustrated to be directly connected to the edge network system 500, the processor 501 and/or the application 505 may exchange data with the edge network system 500 using components for communication of the electronic device 101 (e.g., the wireless communication module 192 in FIG. 1).

Hereinafter, FIG. 6 and FIG. 7 describes a specific embodiment of selecting a third server 530 to request access from among a plurality of third servers 530 when the EEC 503 receives connection information of a plurality of third servers 530 capable of providing the same service from a plurality of second servers 520.

Figure 6:
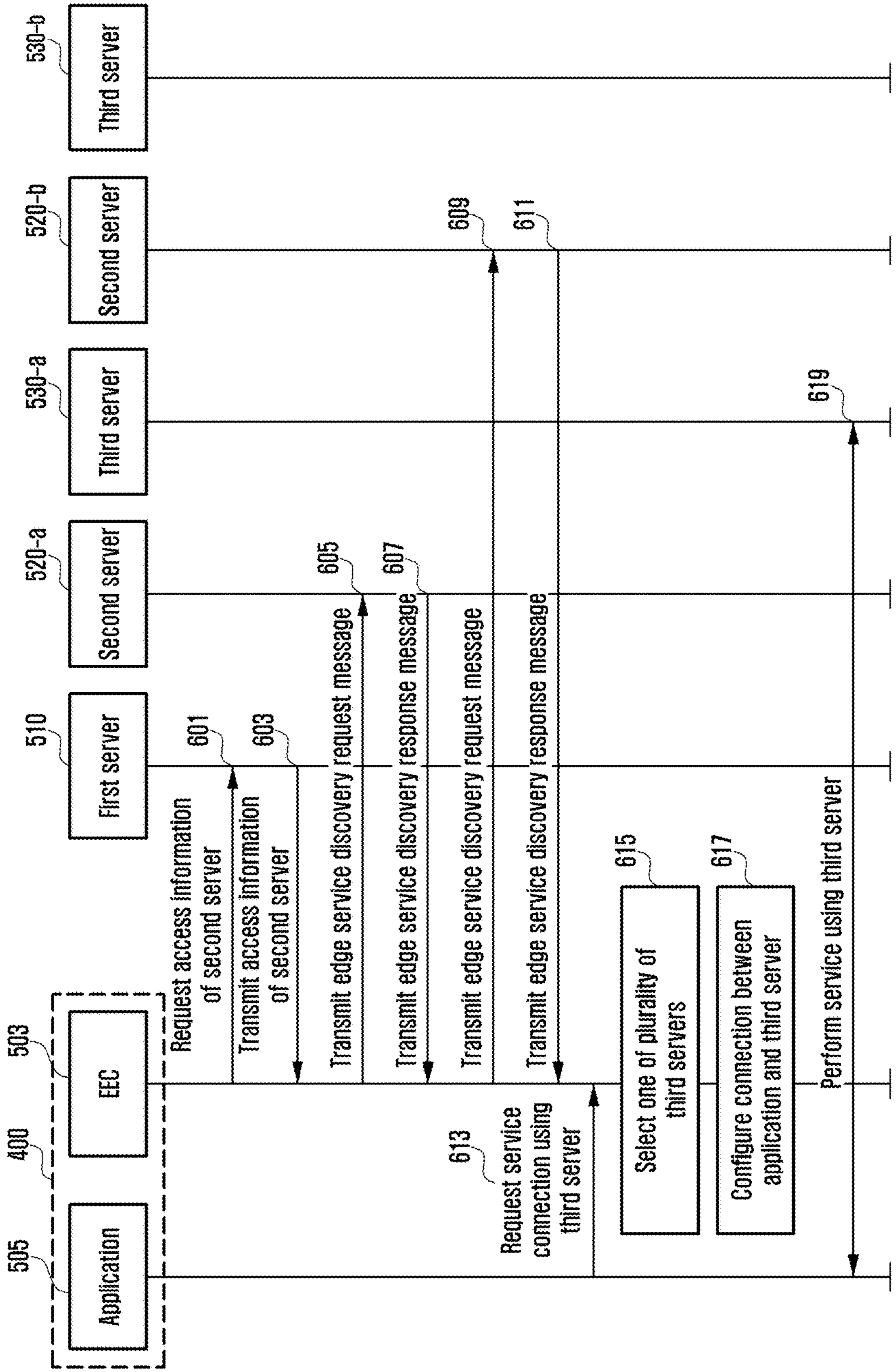
FIG. 6 illustrates a diagram of an embodiment in which an electronic device selects one third server among a plurality of third servers according to various embodiments.

FIG. 6 illustrates a diagram of an embodiment in which an electronic device selects one third server from among a plurality of third servers according to various embodiments.

According to various embodiments, the third server (530-*a* or 530-*b*) accessible based on the access information of the third server (530-*a* or 530-*b*) provided by the plurality of second servers (520-*a* or 520-*b*) may be servers capable of providing at least some of the same services (e.g., a service using the same application).

According to various embodiments, in operation 601, an EEC (e.g., the edge enabler client 503 in FIG. 5) of an electronic device (e.g., the electronic device 400 in FIG. 4) may transmit a signal requesting access information of a second server (e.g., the second server 520 in FIG. 5) to a first server (e.g., the first server 510 in FIG. 5).

According to various embodiments, in operation 603, in response to receiving a request for access information from the second server 520-*a* or 520-*b*, the first server 510 may transmit access information of a plurality of second servers 520-*a* or 520-*b* connected to the first server 510.

According to various embodiments, the access information of the second server 520-*a* or 520-*b* may include at least one of identifiers of each of the plurality of second servers 520-*a* or 520-*b*, IP address information of access address information (e.g., IP address information of the second server 520-*a* or 520-*b*) of the plurality of second servers 520-*a* or 520-*b*, domain information of the second server (520-*a* or 520-*b*), or URI information of the second server 520-*a* or 520-*b*.

According to various embodiments, the first server 510 may determine the priority of the second server 520-*a* or 520-*b* and transmit access information of the second server 520-*a* or 520-*b* including priority information to the EEC 503. The priority may refer to an order in which the electronic device 400 can first connect to a specific second server among the plurality of second servers 520-*a* or 520-*b*. Priorities may be assigned differently for each second server 520-*a* or 520-*b*. When there are a plurality of third servers 530-*a* or 530-*b* capable of providing the same service, the EEC 503 may select one of the plurality of third servers 530-*a* or 530-*b*, based on priority. When there are a plurality of third servers 530-*a* or 530-*b* capable of providing the same service, the EEC 503 may select a third server 530-*a* or 530-*b* corresponding to the second server 520-*a* or 520-*b* (or, connected to the second server (520-*a* or 520-*b*)) having the highest priority. An embodiment of selecting the third server 530-*a* or 530-*b*, based on the priority is described later in operation 615.

According to various embodiments, the first server 510 may store designated priorities of the plurality of second servers 520-*a* or 520-*b*. For example, the priority of the plurality of second servers 520-*a* or 520-*b* may be specified based on a contractual relationship between the operator of the first server 510 and the operator of the plurality of second servers 520-*a* or 520-*b*. For example, among the plurality of third servers 530-*a* and 530-*b*, at least partially providing the same service, the operator of the second server 520-*a* connected to the third server 530-*a* may be different from the operator of the second server 520-*b* connected to the third server 530-*b*. The first server 510 may store the priority of each of the plurality of second servers 520-*a* and 520-*b* designated by the operator. For another example, the priority of each of the plurality of second servers 520-*a* and 520-*b* may be designated based on at least one of coverage or location of each of the second servers 520-*a* and 520-*b* and/or the third servers 530-*a* and 530-*b*. Priority may be specified in various ways except for the above-described embodiments.

According to various embodiments of the disclosure, the second server 520-*a* or 520-*b* may check the performance information of the third server 530-*a* or 530-*b* through a designated method (e.g., periodically requesting transmission of the performance information to the third server 530-*a* or 530-*b* or the third server 530-*a* or 530-*b* periodically transmits performance information of the third server 530-*a* or 530-*b*).

According to various embodiments of the disclosure, the second server 520-*a* or 520-*b* may acquire performance information of the third server 530-*a* or 530-*b* by using a separate resource management entity. For example, the second server 520-*a* or 520-*b* may acquire performance information of the third server 530-*a* or 530-*b* using at least one of the MEC Platform Manager, MEC orchestrator, Operating Support System defined by the European telecommunication standards institute ETSI, or at least one component (e.g., network exposure function NEF) or common application program interface function CAPIF included in the core network (e.g., the core network 420 in FIG. 4).

According to various embodiments, the performance information of the third server 530-*a* or 530-*b* may refer to the performance information of various processing devices (e.g., central processing unit CPU and neural network processing unit NPU, memory, or graphic processing unit GPU) allocated to the third server 530-*a* or 530-*b*. For example, the performance information of the third server 530-*a* or 530-*b* may include at least one of clock speed of CPU allocated to the third server 530-*a* or 530-*b*, remaining capacity of a memory, information (e.g., bandwidth, delay time, transmission rate, reception rate, number of users connected to the third server (530-*a* or 530-*b*)) related to a communication channel allocated to the third server 530-*a* or 530-*b*, or processing speed of a GPU. Each of the second servers 520-*a* or 520-*b* may transmit the performance information of the third server 530-*a* or 530-*b* to the first server 510, and the first server 510 may prioritize the plurality of second servers 520-*a* or 520-*b*, based on the performance information of the third server 530-*a* or 530-*b* each transmitted by the plurality of second servers 520-*a* or 520-*b*.

According to various embodiments, the first server 510 may determine the priority of the plurality of second servers 520-*a* or 520-*b*, based on the performance information of the third server 530-*a* or 530-*b* transmitted from the core network (e.g., the core network 420 in FIG. 4).

According to various embodiments, the access information of the second server 520-*a* or 520-*b* may be the same as or similar to the EES list defined in TS 23.558. the access information of the second server 520-*a* or 520-*b* may include an identifier of the second server 520-*a* or 520-*b*, access address information of the second server 520-*a* or 520-*b*, and/or priority information of the second server 520-*a* or 520-*b*. The access information of the second server 520-*a* or 520-*b* may be implemented as illustrated in Table 3 below and transmitted to the EEC 503.

TABLE 3

| EESID | Access address information | Precedence |
|---|---|---|
| EES 1(the second server (520-a)) | eesl.edgel.com/ 1.1.1.1 | 0(High) |
| EES 2(the second server (520-b)) | ees2.edge2.com | 1 |
| EES 3 | ees3.edge.com | 2 |

According to various embodiments, in operation 605, the EEC 503 may transmit an edge service discovery request message for requesting access information of the third server 530-*a* to the second server 520-*a*, based on the access information of the second server 520-*a*.

According to various embodiments, in operation 607, the second server 520-*a* may transmit an edge service discovery response message including access information of at least one third server 530-*a* connected to the second server 520-*a* to the EEC 503 in response to receiving the edge service discovery request message.

According to various embodiments, the access information of the third server 530-*a* may include an identifier EASID of the third server 530-*a*, identification information ACID of an application 505 installed on the electronic device 400, and/or edge service access address information (e.g., at least one of URI for the third server 530-*a* edge service access, the domain name FQDN of the third server 530-*a*, and the IP address of the third server 530-*a*) of the third server 530-*a*.

According to various embodiments, the access information of the third server 530-*a* may further include performance information of the third server 530-*a*. The second server 520-*a* may check the performance information of the third server 530-*a* through a designated method (e.g., a method of periodically requesting transmission of performance information to the third server 530-*a*, or obtaining performance information of the third server 530-*a* through a separate resource management entity). The second server 520-*a* may transmit an edge service discovery response message including performance information of the verified third server 530-*a* to the EEC 503.

According to various embodiments, in operation 609, the EEC 503 may transmit an edge service discovery request message for requesting access information of the third server 530-*b* to the second server 520-*b*, based on the access information of the second server 520-*b*.

According to various embodiments, operation 605 and operation 609 may be implemented in any order.

According to various embodiments, in operation 611, in response to receiving the edge service discovery request message, the second server 520-*b* may transmit an edge service discovery response message including access information of at least one third server 530-*b* connected to the second server 520-*b* to the EEC 503.

According to various embodiments, the access information of the third server 530-*b* may include the third server 530-*b* or an identifier EASID of the third server 530-*b*, identifier ACID of an application 505 installed on the electronic device 400, and/or access address information (e.g., at least one of URI for the third server 530-*b*, IP address of the third server 530-*b*, and the domain name of the third server 530-*b*) of the third server 530-*b*.

According to various embodiments, the access information of the third server 530-*b* may further include performance information of the third server 530-*b*. The second server 520-*b* may check the performance information of the third server 530-*b* through a designated method (e.g., a method of periodically requesting transmission of performance information to the third server 530-*b*, or obtaining performance information of the third server 530-*b* through a separate resource management entity). The second server 520-*b* may transmit an edge service discovery response message including performance information of the verified third server 530-*b* to the EEC 503.

According to various embodiments, in operation 613, EEC 503 may receive a connection request for a service using the third server 530-*a* or 530-*b* from an application (e.g., the application 505 in FIG. 5).

According to various embodiments, the service using the third server 530-*a* or 530-*b* may refer to an edge computing service using the edge network system 500. The application 505 may be an application capable of using an edge computing service.

According to various embodiments, there may be a plurality of third servers 530-*a* or 530-*b* capable of providing the same service that the application 505 can use. The fact that there are a plurality of third servers 530-*a* or 530-*b* that can provide the same service that the application 505 can use may refer to a state in which at least a part of the third server 530-*a* or 530-*b* can provide the same service to the application 505.

According to various embodiments, in operation 615, the EEC 503 may select one of the plurality of third servers 530-*a* or 530-*b* as a server to execute the connection.

According to various embodiments, the EEC 503 may check whether there are a plurality of third servers 530-*a* or 530-*b* capable of providing a service that can be used by an application 505, based on information on the third server 530-*a* or 530-*b* received from the second servers 520-*a* or 520-*b*.

According to various embodiments, the EEC 503 may check whether there are at least two or more third servers 530-*a* or 530-*b* capable of providing the same service from the access information of the third server 530-*a* or 530-*b* received in operation 607 or 611. For example, the EEC 503 may check the connection information of the third server 530-*a* received in operation 607 and/or the access information of the third server 530-*b* in operation 611, and identify that the third server 530-*a* or 530-*b* can provide the same service, in response to checking that the identifiers EAS IDs of the third server 530-*a* or 530-*b* match each other. For another example, the EEC 503 may check the connection information of the third server 530-*a* received in operation

607 and/or the connection information of the third server 530-*b* received in operation 611 and may identify that the third server 530-*a* or 530-*b* can provide the same service, in response to checking that information ACID indicating a specific application 505 installed on the electronic device 400 is identical to each other. For example, the EEC 503 may check the connection information of the third server 530-*a* received in operation 607 and/or the connection information of the third server 530-*b* received in operation 611 and may identify that the third server 530-*a* or 530-*b* can provide the same service, in response to checking that the domain names (fully qualified domain name FQDN or at least part of the FQDN) of the third server 530-*a* or 530-*b* match each other. According to various embodiments, the EEC 503 may check whether priority information of each of the second servers 520-*a* or 520-*b* exists in the access information of the second server 520-*a* or 520-*b* received from the first server 510. In response to checking that the priority information exists in the access information of the second server 520-*a* or 520-*b*, the EEC 503 may select a third server 530-*a* or 530-*b* to be connected based on the priority information. Referring to Table 3, the EEC 503 may select a third server 530-*a* connected to the second server 520-*a* having the highest priority among the plurality of second servers 520-*a* and 520-*b* as a server to be connected.

According to various embodiments, in response to checking that the priority information does not exist in the access information of the second server 520-*a* or 520-*b*, the EEC 503 may check whether the performance information of the third server 530-*a* or 530-*b* is included in the edge service discovery response message transmitted by each of the third servers 530-*a* or 530-*b*.

According to various embodiments, in response to checking that the performance information of each of the third servers 530-*a* or 530-*b* is included in the edge service discovery response message transmitted by each of the second servers 520-*a* or 520-*b*, the EEC 503 may select a third server 530-*a* or 530-*b* to be connected based on the performance information of the third server 530-*a* or 530-*b* included in the edge service discovery response message.

According to various embodiments, the EEC 503 may select the third server 530-*a* having the highest available resource, based on the performance information of each of the third server 530-*a* or 530-*b*. The EEC 503 may select a third server 530-*a* having the highest performance of an available resource (e.g., CPU) having a high predefined priority among available resources of the third server 530-*a* or 530-*b*, based on the performance information of each of the third servers 530-*a* or 530-*b*.

According to various embodiments, the EEC 503 may select the third server 530-*a* that satisfies a condition (e.g., a condition in which the number of CPU clocks is equal to or greater than a preset value, a condition in which the remaining amount of memory is equal to or greater than a preset value, a condition for whether GPU or NPU is supported, or a condition for available performance if GPU or NPU is supported) related to performance used by the executed application 505.

According to various embodiments, the EEC 503 may select the third server 530-*a* in consideration of the weight allocated for each available resource (e.g., CPU, GPU, NPU, or memory) of the third server 530-*a* or 530-*b*. For example, the EEC 503 may select the third server 530-*a* having the largest value calculated by Equation 1 below.

$$\text{weighted sum}=a*C/Cn+b*G/Gn+c*M/Mn+d*S/Sn \quad \text{[Equation 1]}$$

(a, b, c, d: weight, C: CPU performance of the third server 530-*a* or 530-*b*, Cn: Normalized value of CPU performance of the third server 530-*a* or 530-*b*, G: GPU performance of the third server 530-*a* or 530-*b*, Gn: normalized value of GPU performance of the third server 530-*a* or 530-*b*, M: third server 530-*a* or 530-*b* volatile memory capacity, Mn: normalized value of the memory capacity of the third server 530-*a* or 530-*b*, S: nonvolatile memory capacity of the third server 530-*a* or 530-*b*, Sn: the normalized value of the nonvolatile memory capacity of the third server 530-*a* or 530-*b*).

According to various embodiments, the EEC 503 may change the weight, based on the characteristics of the executed application 505. For example, in the case of an application that uses a service that uses a relatively large amount of CPU of the third server 530-*a* or 530-*b*, the EEC 503 may increase the weight related to the CPU performance of the third server 530-*a* or 530-*b*. For example, in the case of an application that uses a service that uses a relatively large amount of GPU of the third server 530-*a* or 530-*b*, the EEC 503 may increase the weight related to the GPU performance of the third server 530-*a* or 530-*b*.

According to various embodiments, in response to checking that the performance information of the third server 530-*a* or 530-*b* does not exist in the edge service discovery response message transmitted by each of the second servers 520-*a* and 520-*b*, the EEC 503 may select a third server 530-*a* or 530-*b* to be connected, based on the state (e.g., response speed) of the communication connection between the second server 520-*a* and 520-*b* and the electronic device 400.

According to various embodiments, the state of the communication connection between the second server 520-*a* or 520-*b* and the electronic device 400 may be determined by the data transmission speed (or, data reception speed, response delay time) between each of the second servers 520-*a* or 520-*b* and the electronic device 400. According to an embodiment, in a method (e.g., edge service discovery response message and round trip time (RTT) of edge service discovery request message) that compares the transmission time of the edge service discovery request message transmitted in operations 605 and 609 and the reception time of the edge service discovery response message received in operations 607 and 611, the EEC 503 may check the status of the communication connection between each of the second servers 520-*a* or 520-*b* and the electronic device 400. The EEC 503 may select a third server 530-*a* provided by the second server 520-*b* having a relatively good communication connection state. (e.g., high data reception rate or short round trip time (RTT)).

According to another embodiment, in response to checking that the performance information of the third server 530-*a* or 530-*b* does not exist in the edge service discovery response message transmitted by each of the second servers 520-*a* and 520-*b*, the EEC 503 may select a third server 530-*a* or 530-*b* to be connected, based on a state of a communication channel between each of the third servers 530-*a* or 530-*b* and the electronic device 400.

According to various embodiments, the state of the communication connection between the third server 530-*a* or 530-*b* and the electronic device 400 may be determined by the data transmission speed (or, data reception speed) between each of the third server 530-*a* or 530-*b* and the electronic device 400. According to an embodiment, the EEC 503 may transmit a test signal (e.g., a ping signal) to each of the third servers 530-*a* or 530-*b* and check the state of a communication connection between each of the third servers 530-*a* or 530-*b* and the electronic device 400, based on a reception time of a response signal corresponding to the test signal. The EEC 503 may select the third server 530-*a* having a relatively high communication connection state.

According to various embodiments, in operation 617, the EEC 503 may set a connection between the application 505 and the selected third server 530-*a*.

According to various embodiments, in operation 617, the method for the EEC 503 to set a connection with the third server 530-*a* to the application 505 may include a method of setting the application 505 to communicate with the application installed in the third server 530-*a* by transmitting connection information of the third server 530-*a* to the application 505. For example, the EEC 503 may transmit a response message including access address information (e.g., IP addresses of server applications 531 and 533) of the server application to the domain name system DNS query request of the client application to the application 505. The application 505 may be configured to communicate with the application of the third server 530-*a*, based on access information of the server application.

According to various embodiments, the electronic device 400 (or the processor 501) may set a dedicated network channel for connection between the application 505 and the third server 530-*a*. For example, the processor 501 may control the communication circuit (e.g., the wireless communication module 192 in FIG. 1) to generate a first channel that is a designated network interface (e.g., establish a PDU session dedicated to the application 505 or connect to a dedicated DNN gateway). The electronic device 400 (or the processor 501) may control the communication circuit 192 so that the applications 505 transmit or receive data through the designated network interface.

According to various embodiments, in operation 619, the application 505 may perform a service using the third server 530-*a* by transmitting or receiving application data with the third server 530-*a* connected in operation 617.

Figure 7:
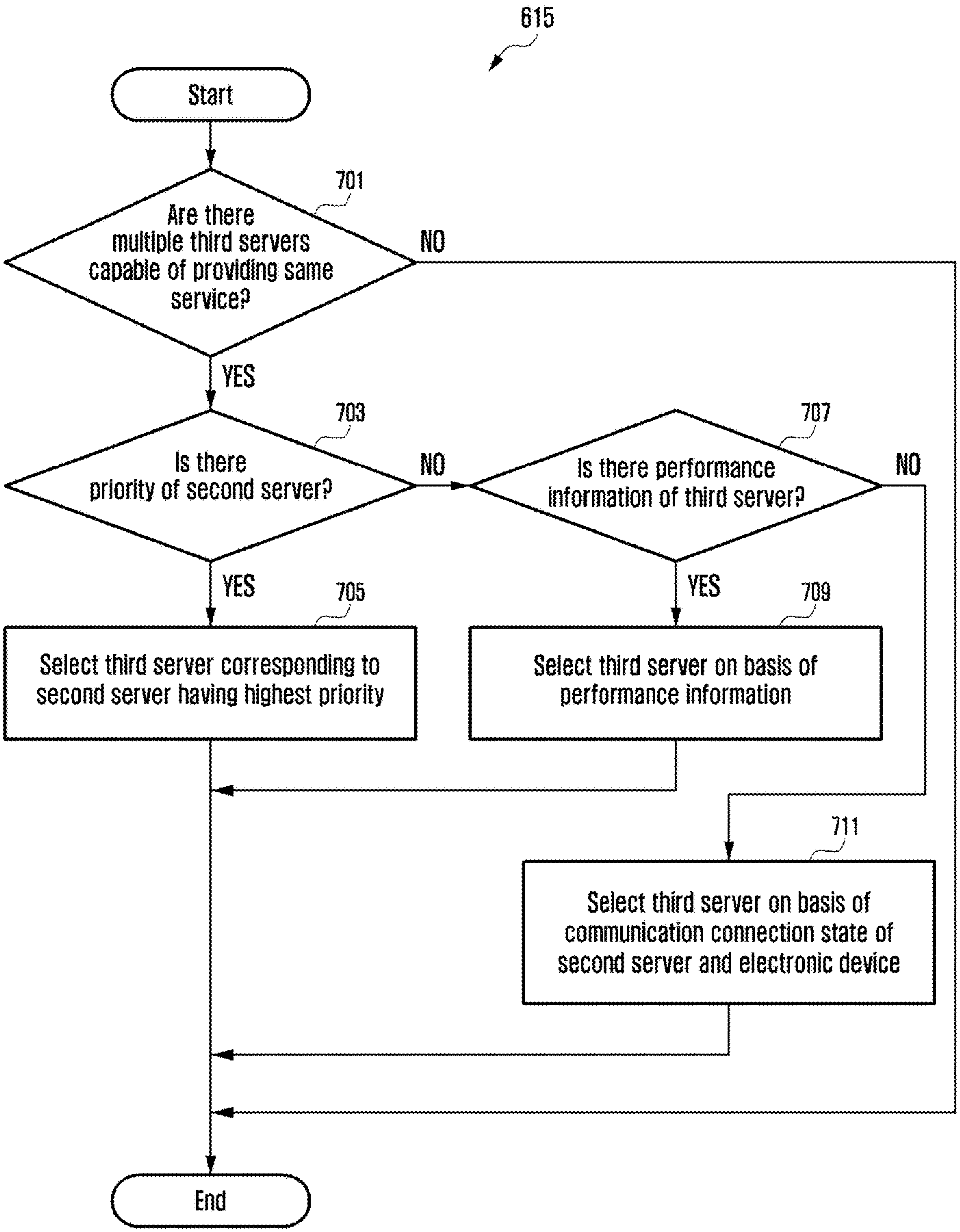
FIG. 7 illustrates a flowchart of an operation of selecting one third server among a plurality of third servers by an electronic device according to various embodiments.

FIG. 7 illustrates a flowchart of an operation of selecting one third server from among a plurality of third servers by an electronic device according to various embodiments.

According to various embodiments, in operation 701, an EEC (e.g., the EEC 503 in FIG. 5) executed on the processor (e.g., the processor 501 in FIG. 5 or the application 505) may check whether there are a plurality of third servers 530-*a* or 530-*b* capable of providing the same service that can be used by the application 505, based on information about the third servers (e.g., the third server 530-*a* or 530-*b* of FIG. 6) received from the second servers (e.g., the second server 520-*a* or 520-*b* of FIG. 6).

According to various embodiments, there may be a plurality of third servers 530-*a* or 530-*b* capable of providing the same service that the application 505 can use. The fact that there are a plurality of third servers 530-*a* or 530-*b* that can provide the same service that the application 505 can use may refer to a state in which at least a part of the third server 530-*a* or 530-*b* can provide the same service to the application 505.

According to various embodiments, the priority may refer to an order in which a specific second server can be connected among the plurality of second servers 520-*a* or 520-*b*. Priorities may be differently assigned to each of the second servers 520-*a* or 520-*b*. Each of the second servers 520-*a* or 520-*b* can check performance information of the connected third server 530-*a* or 530-*b* through a designated method (e.g., a method of periodically requesting transmission of performance information to a third server 530-*a* or 530-*b*, or a method of periodically transmitting performance information of a third server by a third server 530-*a* or 530-*b*).

According to various embodiments, the second server 520-*a* or 520-*b* may acquire performance information of the third server 530-*a* or 530-*b* by using a separate resource management entity. For example, the second server 520-*a* or 520-*b* may acquire performance information of the third server 530-*a* or 530-*b* using at least one of the MEC Platform Manager, MEC orchestrator, operating support system defined by European telecommunication standards institute ETSI standard, or at least one component (e.g., network exposure function NEF or common application program interface function CAPIF) included in the core network (e.g., core network 420 in FIG. 4).

According to various embodiments, the performance information of the third server 530-*a* or 530-*b* may include performance information of the processing unit (e.g., CPU, NPU, memory or GPU) allocated to the third server 530-*a* or 530-*b*. For example, the performance information of each of the third server 530-*a* or 530-*b* may include at least one of clock speed of CPU allocated to the third server 530-*a* or 530-*b*, remaining capacity of a memory, information (e.g., bandwidth, delay time, transmission rate, reception rate, number of users connected to the third server 530-*a* or 530-*b*) related to a communication channel allocated to the third server 530-*a* or 530-*b*, or processing speed of a GPU. Each of the second servers 520-*a* or 520-*b* transmits the performance information of the third server 530-*a* or 530-*b* to the first server 510, and the first server 510 may prioritize the plurality of second servers 520-*a* or 520-*b*, based on the performance information of the third server 530-*a* or 530-*b* each transmitted by the plurality of second servers 520-*a* and 520-*b*.

According to various embodiments, in operation 703, in response to checking that there are a plurality of third servers 530-*a* or 530-*b* (operation 701-Y) capable of providing a service, the processor 501 or EEC 503 may check whether priority information of each of the second servers 520-*a* or 520-*b* exists in the access information of the second server 520-*a* or 520-*b* received from the first server 510.

According to another embodiment, the first server 510 may determine the priority of the plurality of second servers 520-*a* or 520-*b*, based on the performance information of the third server 530-*a* or 530-*b* transmitted from the core network (e.g., core network 420 in FIG. 4).

According to various embodiments, in operation 705, in response to checking that the priority information exists in the access information of the second server 520-*a* or 520-*b* (operation 703-Y), the processor 501 or EEC 503 may select the third server 530-*a* or 530-*b* to be connected, based on the priority information. Referring to Table 3, the EEC 503 may select the third server 530-*a* connected to the second server 520-*a* having the highest priority among the plurality of second servers 520-*a* and 520-*b* as a server to be connected.

According to various embodiments, in operation 707, in response to checking that the priority information does not exist in the access information of the second server 520-*a* or 520-*b* (operation 703-N), the processor 501 or EEC 503 may check whether the performance information of the third server 530-*a* or 530-*b* is included in the edge service discovery response message transmitted by the third server 530-*a* or 530-*b*.

According to various embodiments, in operation 709, in response to checking that the performance information of the third server 530-*a* or 530-*b* is included in the edge service discovery response message transmitted from the third server 530-*a* or 530-*b* (operation 707-Y), the processor 501 or EEC 503 may select the third server 530-*a* or 530-*b* to be connected, based on the performance information of the third server 530-*a* or 530-*b* included in the edge service discovery response message.

According to various embodiments, the EEC 503 may select the third server 530-*a* having the highest available resource, based on the performance information of the third server 530-*a* or 530-*b*. The EEC 503 may select a third server 530-*a* with the highest performance of available resources (e.g., CPU) having a high predefined priority among available resources of the third server 530-*a* or 530-*b*, based on the performance information of the third server 530-*a* or 530-*b*.

According to various embodiments, the EEC 503 may select the third server 530-*a* that satisfies a condition (e.g., a condition in which the number of CPU clocks is equal to or greater than a preset value or a condition in which the remaining memory capacity is equal to or greater than a preset value) related to performance used by the executed application 505.

According to various embodiments, the EEC 503 may select the third server 530-*a* in consideration of the weight allocated for each available resource (e.g., CPU, GPU, NPU, or memory) of the third server 530-*a* or 530-*b*.

According to various embodiments, the EEC 503 may change the weight, based on the characteristics of the executed application 505. For example, in the case of an application that uses a service that uses a relatively large amount of CPU of the third server 530-*a* or 530-*b*, the EEC 503 may increase a weight related to the CPU performance of the third server 530-*a* or 530-*b*. For example, in the case of an application that uses a service that uses a relatively large amount of GPU of the third server 530-*a* or 530-*b*, the EEC 503 may increase a weight related to the GPU performance of the third server 530-*a* or 530-*b*.

According to various embodiments, in operation 711, in response to checking that the performance information of the third server 530-*a* or 530-*b* does not exist in the edge service discovery response message transmitted by the third server 530-*a* or 530-*b* (operation 707-N), the processor 501 or EEC 503 may select a third server 530-*a* or 530-*b* to be connected, based on the state of the communication connection between the second server 520-*a* or 520-*b* and the electronic device 400.

According to various embodiments, the state of the communication connection between the second server 520-*a* or 520-*b* and the electronic device 400 may be determined by the data transmission speed (or data reception speed) of the second server 520-*a* or 520-*b* and the electronic device 400. According to an embodiment, the EEC 503 may check the status of the communication connection between the second server 520-*a* or 520-*b* and the electronic device 400 in a method (e.g., round trip time (RTT) of edge service discovery request message and edge service discovery response message) of comparing the transmission time of the edge service discovery request message transmitted in operations 605 and 609 and the reception time of the edge service discovery response message received in operations 607 and 611. The EEC 503 may select a third server 530-*a* provided by the second server 520-*b* having a relatively high communication connection state (e.g., high data reception speed or short response delay time RTT).

According to another embodiment, in response to checking that the performance information of the third server 530-*a* or 530-*b* is included in the edge service discovery response message transmitted by the second server 520-*a* or 520-*b*, the EEC 503 may select a third server 530-*a* or 530-*b* to be connected, based on the state of a communication channel between the third server 530-*a* or 530-*b* and the electronic device 400.

Through the above method, when there are a plurality of third servers 530-*a* or 530-*b* providing services that can be used by an application 505, the electronic device 400 may select a third server capable of providing the highest quality service among the plurality of third servers.

Hereinafter, FIGS. 8 and 9 describe specific embodiments in which the EEC 503 switches the application installed on the third server 530 included in the access information of the third server 530 received from the second server 520 from inactive state to active state.

Figure 8:
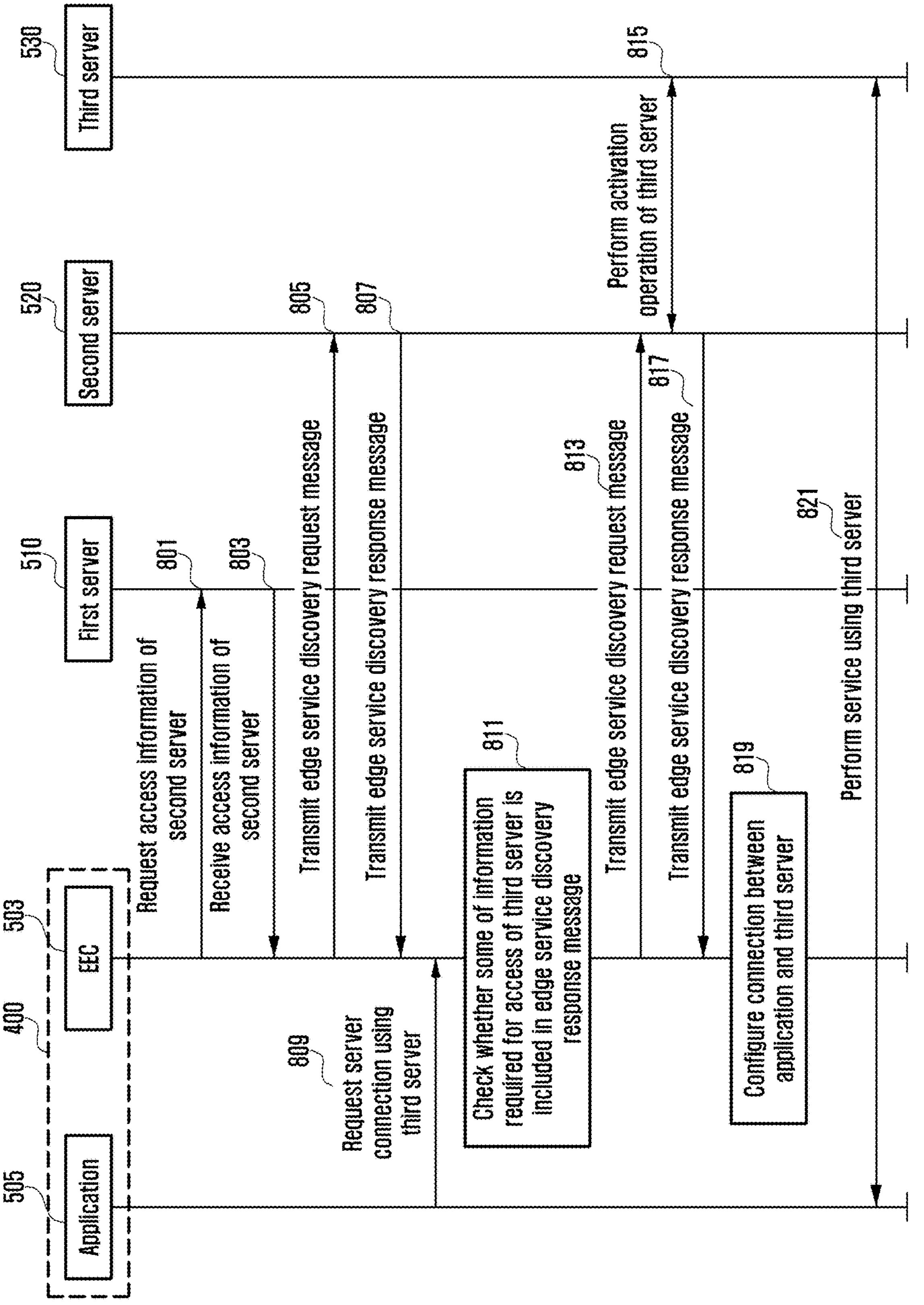
FIG. 8 illustrates a diagram of an embodiment in which an electronic device activates a third server using transmission of an edge service discovery request message according to various embodiments.

FIG. 8 illustrates a diagram of an embodiment in which an electronic device activates a third server using transmission of an edge service discovery request message according to various embodiments.

According to various embodiments, activation of the third server may mean switching an application installed on the third server (e.g., the third server 530 in FIG. 4) into an activated state.

According to various embodiments, in operation 801, an EEC (e.g., the edge enabler client 503 in FIG. 5) of the electronic device (e.g., the electronic device 400 in FIG. 4) may transmit a signal requesting access information of a second server (e.g., the second server 520 in FIG. 5) to a first server (e.g., the first server 510 in FIG. 5).

According to various embodiments, in operation 803, the first server 510 may transmit access information of the second server 520 connected to the first server 510 in response to receiving a request for access information from the second server 520.

According to various embodiments, the access information of the second server 520 may include an identifier of the second server 520 and/or access address information (e.g., IP address information of the second server 520, domain information of the second server 520, or URI information of the second server 520) of the second server 520.

According to various embodiments, in operation 805, the EEC 503 may transmit an edge service discovery request message for requesting access information of the third server 530 to the second server 520, based on the access information of the second server 520. The edge service discovery request message may include an identifier of the EEC 503, token information for authenticating access rights of the second server 520, and/or information (e.g., the identifier EAS ID of the third server 530, information indicating a specific application ACID installed in the electronic device 400, a service permission level, a desired service function, or an available location information of the third server 530) indicating a discovery condition of a third server 530 connected to the second server 520. The edge service discovery request message may be implemented, for example, in the form illustrated in Table 4 below.

TABLE 4

| | |
|---|---|
| Identifier of EEC 503 | 1000 |
| Access token of the second server 520 | 123456780 |
| Query filter | null |

According to various embodiments, in operation 807, in response to receiving the edge service discovery request message, the second server 520 may transmit an edge service discovery response message including access information of the third server 530 connected to the second server 520 to the EEC 503. The edge service discovery response message may be implemented, for example, in the form illustrated in Table 5.

TABLE 5

| List of the third server | Value | |
|---|---|---|
| Identifier (EASID) of the third server | EAS1 | |
| Access address information of the third server | Domain name | null |
| | IP address | null |
| Identifier (ACID) of an application installed on the electronic device 400 | com.andriod.app1 | |

Referring to Table 5, the edge service discovery response message may include an identifier (EASID) of the third server 530 and information that is used for accessing the third server 530. The information for accessing the third server may include an access address (at least one of a URI, a domain name, and an IP address) of the third server 530 and/or an application identifier (ACID) installed in the electronic device 400.

According to various embodiments, the third server 530 may be temporarily or non-temporarily not instantiated. The fact that the third server 530 is temporarily or non-temporarily not instantiated may refer to that an edge service (application) executable on the third server 530 is in an inactive state. In a case that the third server 530 is not instantiated state, the second server 520 may not receive some information that is used for accessing the third server 530, and the edge service discovery response message transmitted by the second server 520 may not include at least some of the information that is used for accessing the third server 530.

According to various embodiments, in operation 809, the EEC 503 may receive a connection request for a service using the third server 530 from an application (e.g., the application 505 in FIG. 5). In case that the application 505 is switched from an inactive state to an active state, the application 505 is first installed on the electronic device 400, or the application 505 is switched from the background state to the foreground state, the application 505 may transmit a connection request for a service using the third server 530 to the EEC 503.

According to various embodiments, in operation 811, the EEC 503 may check whether a part of information that is used for accessing the third server 530 is included in the edge service discovery response message. In a case that the third server 530 is temporarily or non-temporarily inactive, some of the information that is used for accessing the third server 530 may not exist in the edge service discovery response message.

According to various embodiments, in operation 813, the EEC 503 may transmit an edge service discovery request message to the second server 520 in response to checking that some of the information that is used for accessing the third server 530 does not exist in the edge service discovery response message. The edge service discovery request message transmitted in operation 813 may further include information indicating a service that can be used by the application 505. Information indicating a service that the application 505 can use may include an identifier (ACID) of an application executed on the electronic device 400 or an identifier (EASID) of a third server 530. The edge service discovery request message transmitted in operation 813 may be implemented, for example, in the form illustrated in Table 6.

TABLE 6

| | |
|---|---|
| Identifier of EEC 503 | 1000 |
| Access token of the second server 520 | 123456780 |
| Identifier (ACID) of an application 505 installed on the electronic device 400 | com.andriod.app1 |
| Query filter | all or Identifier (EASID) of the third server |

According to various embodiments, in operation 815, the second server 520 may receive the edge service discovery request message and check a service identifier (e.g., at least one of EASID, ACID, and FQDN) included in the edge service discovery request message. The second server 520 may activate an edge service (application) of the third server 530 capable of providing a service corresponding to the service identifier. Although not illustrated in FIG. 8, the second server 520 may activate the third server 530 by further using a component that activates the third server 530. For example, the second server 520 may activate the third server 530 using at least one of the MEC Platform Manager, MEC orchestrator, Operating Support System defined by the European telecommunication standards institute ETSI, or at least one component (e.g., network exposure function NEF) or common application program interface function CAPIF included in the core network (e.g., the core network 420 in FIG. 4).

According to various embodiments, in operation 817, the second server 520 may transmit an edge service discovery response message to the EEC 503. As the third server 530 is switched to the active state, information that is used for accessing the third server 530 may exist in the edge service discovery response message. The edge service discovery response message may be implemented, for example, in the form illustrated in Table 7.

TABLE 7

| List of the third server | Value | |
|---|---|---|
| Identifier (EASID) of the third server | EAS1 | |
| Access address information of the third server | Domain name | app1.edge.com |
| | IP address | 3.1.1.1 |
| Identifier (ACID) of an application installed on the electronic device 400 | com.andriod.appl | |

According to various embodiments, in operation 819, the EEC 503 may connect with the third server 530, based on the access information of the third server 530 included in the edge service discovery response message.

According to various embodiments, in operation 821, the application 505 may perform a service using the third server 530 by transmitting or receiving application data to or from the third server 530 connected in operation 819.

Figure 9:
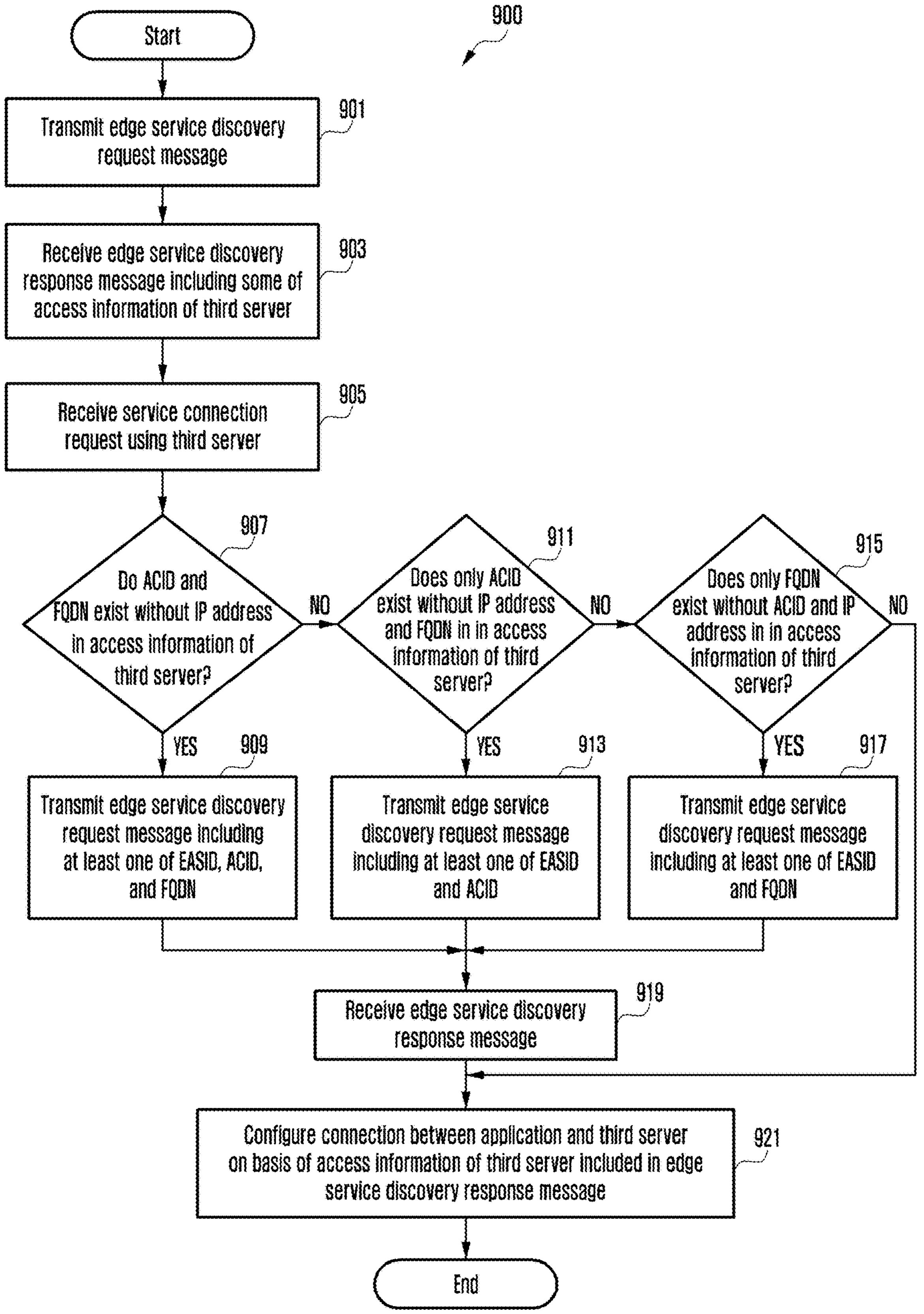
FIG. 9 illustrates a flowchart of an operation of activating a third server using transmission of an edge service discovery request message by an electronic device according to various embodiments.

FIG. 9 illustrates a flowchart of an operation of activating 900 a third server using transmission of an edge service discovery request message by an electronic device according to various embodiments.

According to various embodiments of the disclosure, in operation 901, the EEC (e.g., the EEC 503 in FIG. 5) executed on the processor (e.g., the processor 501 of in FIG. 5) of the electronic device (e.g., the electronic device 400 in FIG. 4) or on the processor 501 may transmit an edge service discovery request message to the second server 520 for requesting access information of the third server (e.g., the third server 530 in FIG. 5), based on the access information of the second server (e.g., the second server 520 in FIG. 5).

According to various embodiments, the edge service check request message may include an identifier of the EEC 503, token information for authenticating access rights of the second server 520, and/or information (e.g., information indicating a specific service or a specific third server 530) indicating a discovery condition of a third server 530 connected to the second server 520.

According to various embodiments, in operation 903, the processor 501 or the EEC 503 may receive an edge service discovery response message including at least part of the access information of the third server 530.

According to various embodiments, the edge service discovery response message may include access information of the third server 530. The access information of the third server 530 may include an identifier EASID of the third server 530 and information that is used for access to the third server 530. Information for accessing the third server may include access address information (e.g., the domain name of the third server 530 or the IP address of the third server 530) of the third server 530 and/or an identifier of the application 505 installed in the electronic device 400.

For the description of FIG. 9, for example, it is assumed that the electronic device 400 receives one edge service discovery response message among the edge service discovery response messages described in Cases 1 to 6 illustrated in Table 8.

TABLE 8

| Case | Identifier (EASID) of the third server | Access address information of the third server: Domain name (FQDN) | Access address information of the third server: IP address | Identifier (ACID) of an application installed on the electronic device 400 |
|---|---|---|---|---|
| 1 | eas1 | app1.edge.com | 3.3.3.1 | com.andriod.app1 |
| 2 | eas2 | app2.edge.com | — | com.andriod.app2 |
| 3 | eas3 | app3.edge.com | eas3.app3.edge.com | com.andriod.app3 |
| 4 | eas4 | — | — | com.andriod.app4 |
| 5 | eas5 | app5.edge.com | 3.3.3.5 | — |
| 6 | eas6 | app6.edge.com | — | — |

According to various embodiments, in operation 905, the processor 501 or the EEC 503 may receive a service connection request using the third server 530 from an application (e.g., the application 505 in FIG. 5).

According to various embodiments, when an application 505 is switched from an inactive state to an active state, when the application 505 is first installed on the electronic device 400, or when the application 505 is transitioned from the background state to the foreground state, the application 505 may transmit a connection request for a service using a third server 530 to EEC 503.

According to various embodiments, in operation 907, the processor 501 or the EEC 503 may check whether the IP address does not exist in the access information of the third server 530 included in the edge service discovery response message, and the identifier ACID and domain name FQDN of the application 505 installed on the electronic device 400 exist.

Referring to Table 8, it can be seen that the edge service discovery response message corresponding to Case 2 of Table 8 satisfies the checking condition of operation 907. It can be seen that the edge service discovery response message corresponding to Cases 1, 3, 4, 5, and 6 of Table 8 does not satisfy the checking condition of operation 907.

According to various embodiments, in operation 909, in response to checking that the IP address does not exist in the access information of the third server 530 and that the identifier ACID and domain name FQDN of the application 505 installed on the electronic device 400 exist (operation 907-Y), the processor 501 or the EEC 503 may transmit again an edge service discovery request message including at least one of an identifier EASID (eas2) of a third server 530, an identifier ACID (e.g., com.android.app2) of an application 505 installed on the electronic device 400, and a domain name (app2.edge.com) to the second server 520. The edge service discovery request message transmitted in operation 909 may be implemented, for example, in the form illustrated in Table 9.

TABLE 9

| | |
|---|---|
| Identifier of EEC 503 | 1000 |
| Access token of the second server 520 | 123456780 |
| Identifier (ACID) or Domain name (FQDN) of an application installed on the electronic device 400 | com.andriod.app2 |
| Query filter (optional) | eas2 or app2.edge.com |

According to various embodiments, in operation 911, in response to checking that the third server 530 does not exist in which the IP address does not exist in the access information and only the identifier (ACID) and domain name (FQDN) of the application installed on the electronic device 400 exist (operation 907-N), the processor 501 or EEC 503 may check whether an IP address or domain name FQDN does not exist in the access information of the third server 530, and only an identifier of an application 505 installed on the electronic device 400 exists.

Referring to Table 8, it can be seen that the edge service discovery response message corresponding to Case 4 in Table 8 satisfies the checking condition of operation 911. It can be seen that the edge service discovery response message corresponding to Cases 1, 3, 5, and 6 in Table 8 does not satisfy the checking condition of operation 911.

According to various embodiments, in operation 913, in response to checking that the IP address or domain name does not exist in the access information of the third server 530 and only the identifier (ACID) of the application installed on the electronic device 400 exists (operation 911-Y), the processor 501 or EEC 503 may transmit again an edge service discovery request message including at least one of the identified identifier EASID (e.g., eas4) of the application installed on the third server 530 and the identifier ACID (e.g., com.android.app4) of the application 505 installed on the electronic device 400 to the second server 520. The edge service discovery request message transmitted in operation 909 may be implemented in the form illustrated in Table 10.

TABLE 10

| | |
|---|---|
| Identifier of EEC 503 | 1000 |
| Access token of the second server 520 | 123456780 |
| Identifier (ACID) of an application installed on the electronic device 400 | com.andriod.app4 |
| Query filter | eas4 |

According to various embodiments, in operation 915, in response to checking that the third server 530 does not exist in which the IP address does not exist in the access information and only the identifier (ACID) and domain name (FQDN) of the application installed on the electronic device 400 exist (operation 911-N), the processor 501 or the EEC 503 may check whether the IP address and the identifier ACID of the application 505 installed on the electronic device 400 do not exist in the access information of the third server 530 and only a domain name exists.

Referring to Table 8, it can be seen that the edge service discovery response message corresponding to Case 6 in Table 8 satisfies the checking condition of operation 915. It can be seen that the edge service discovery response message corresponding to each corresponding to Case 1, Case 3, and Case 5 in Table 8 does not satisfy the checking condition of operation 915. The edge service discovery response message corresponding to Case 1, Case 3, and Case 5 may be a case in which the edge service discovery response message includes all access address information of the third server 530 (e.g., the domain name and the IP address of the third server), and the processor 501 or the EEC 503 may perform an operation 921 in response to checking that the edge service discovery response message includes all access address information of the third server 530 (operations 915-N).

According to various embodiments, in operation 917, in response to checking that the IP address and the identifier (ACID) of the application 505 installed on the electronic device 400 in the access information of the third server 530 does not exist, and only the domain name exists (operation 915-Y), the processor 501 or the EEC 503 may transmit an edge service discovery request message including at least one of an identifier EASID and a domain name FQDN of the third server 530 to the second server 520. The edge service discovery request message transmitted in operation 909 may be implemented, for example, in the form illustrated in Table 11.

TABLE 11

| | |
|---|---|
| Identifier of EEC 503 | 1000 |
| Access token of the second server 520 | 123456780 |
| Identifier (ACID) of an application 505 installed on the electronic device 400 | Null or identifier ACID of the application 505 requesting the edge service connection |
| Query filter | eas6 |

According to various embodiments, the edge service discovery request message transmitted in operation 909, operation 913 and/or operation 917 may further include some of the information (e.g., the identifier EASID of the third server 530, the domain name FQDN of the third server 530, the identifier ACID of the application installed in the electronic device 400) that can indicate the edge service of the third server 530 included in the edge service discovery response message received in operation 903, from the edge service discovery request message transmitted in operation 901.

The second server 520 may check an application of the third server 530 in inactive state, based on information (e.g., the identifier EASID of the third server 530, the identifier of the application installed on the electronic device 400 ACID, or the domain name FQDN of the third server 530) capable of indicating an edge service (application) of the third server 530 included in the retransmitted edge service discovery request message, and activate the application of the third server 530.

According to various embodiments, in operation 919, the processor 501 or the EEC 503 may receive an edge service discovery response message transmitted from the second server 520. As the application of the third server 530 is switched to the active state, information that is used for accessing the third server 530 may exist in the edge service discovery response message. The edge service discovery response message may be implemented, for example, in the form illustrated in Table 7.

According to various embodiments, in operation 921, the processor 501 or the EEC 503 may set a connection between the application 505 and the third server 530, based on the access information of the third server 530 included in the edge service discovery response message.

According to various embodiments, the application 505 may perform a service using the third server 530 by transmitting or receiving application data with the third server 530 connected in operation 921.

The electronic device 400 may activate the third server 530 through a method of retransmitting an edge service discovery request message including information capable of indicating the third server 530 in an inactive state and may activate the third server 530 through retransmission of the edge service discovery request message without a separate operation for activating the inactive third server 530

Hereinafter, FIGS. 10 and 11 describe specific embodiments in which the EEC 503 determines whether or not the access information of the third server 530 received from the second server 520 expires.

Figure 10:
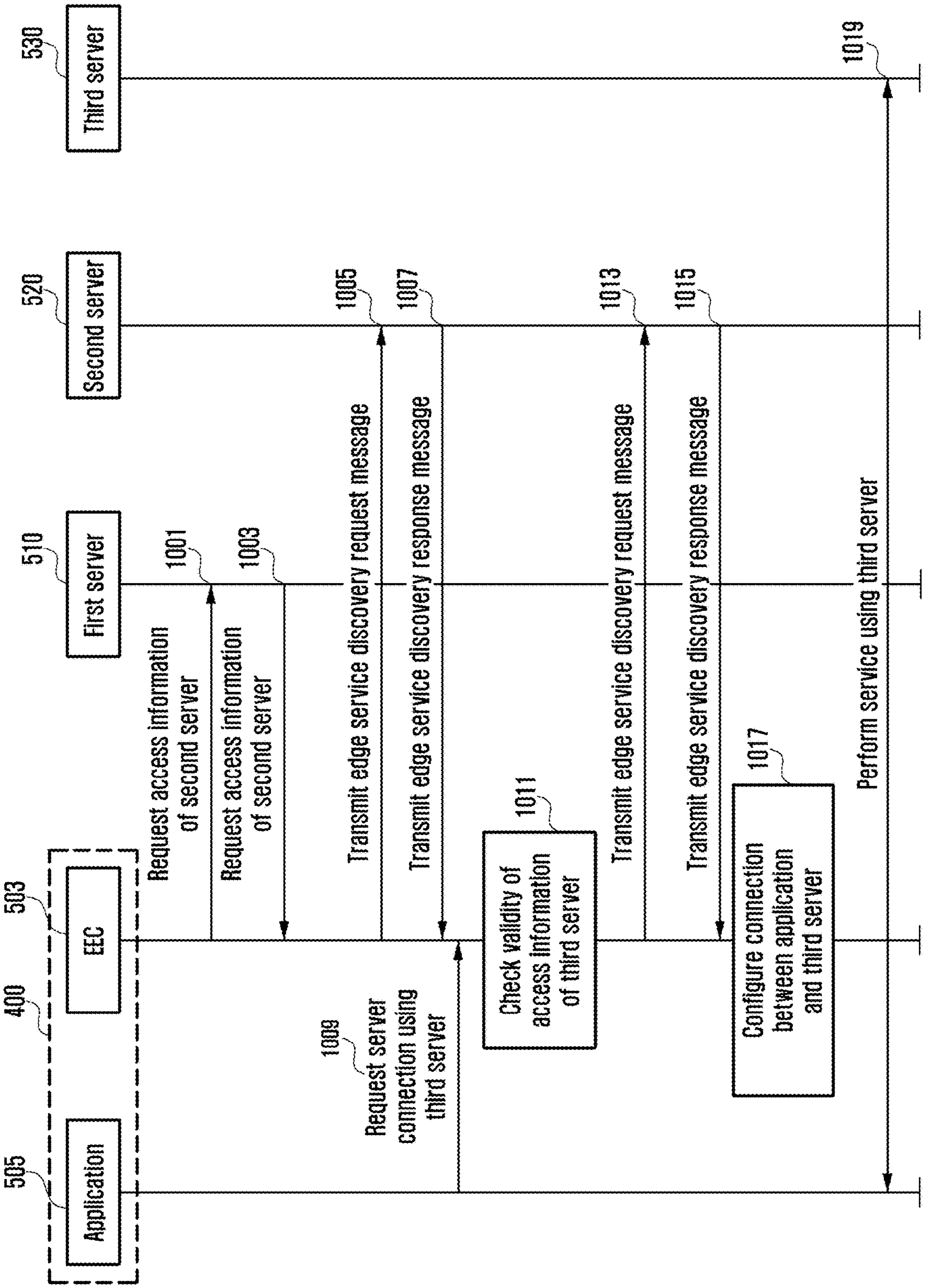
FIG. 10 illustrates a diagram of an embodiment in which an electronic device transmits an edge service discovery request message according to whether access information of a third server expires according to various embodiments.

FIG. 10 illustrates a diagram of an embodiment in which an electronic device transmits an edge service discovery request message according to whether access information of a third server expires according to various embodiments of the disclosure.

According to various embodiments, in operation 1001, an EEC (e.g., the edge enabler client 503 in FIG. 5) of the electronic device (e.g., the electronic device 400 in FIG. 4) may transmit a signal requesting access information of the second server (e.g., the second server 520 in FIG. 5) to the first server (e.g., the first server 510 in FIG. 5).

According to various embodiments, in operation 1003, the first server 510 may transmit access information of the second server 520 connected to the first server 510 in response to receiving a request for access information from the second server 520.

According to various embodiments, the access information of the second server 520 may include at least one of an identifier of the second server 520, IP address information of the second server 520, domain information of the second server 520, or URI information of the second server 520.

According to various embodiments, in operation 1005, the EEC 503 may transmit an edge service discovery request message requesting access information of the third server 530 to the second server 520, based on the access information of the second server 520. The edge service discovery request message may include an identifier of the 503, token information for authenticating access rights of the second server 520, and/or information (e.g., an identifier EAS ID of the third server 530 or an identifier ACID of an application installed on the electronic device 400) indicating a discovery condition of the third server 530 connected to the second server 520.

According to various embodiments, in operation 1007, in response to receiving the edge service discovery request message, the second server 520 may transmit an edge service discovery response message including access information of the third server 530 connected to the second server 520 to the EEC 503. The edge service discovery response message may be implemented, for example, in the form illustrated in Table 12.

TABLE 12

| List of the third server | Value | |
|---|---|---|
| Identifier of the third server | EAS1 | |
| Assess address information of third server | Domain name | app1.edge.com |
| | IP address | 1.1.1.1. |
| Identifier (ACID) of application 505 installed on electronic device 400 | com.andriod.appl | |
| TTL(time to live) | 60 | |
| Identifier of third server | EAS2 | |
| Assess address information of third server | Domain name | app2.edge.com |
| | IP address | 2.2.2.2. |
| Identifier (ACID) of application 505 installed on electronic device 400 | com.andriod.app2 | |
| TTL(time to live) | 300 | |

Referring to the edge service discovery response message listed in Table 12, the edge service discovery response message may include access information of the two third servers 530. The access information of the third server 530 may include an identifier EASID of a third server 530, access address information of the third server 530 (e.g., domain name of the third server 530, IP address of the third server 530), an identifier ACID of an application installed on the electronic device 400 and/or a TTL. The TTL may refer to a valid time of access information of the third server 530. For example, the access information of the third server 530 may be valid within a time designated as TTL from the time when the edge service discovery response message is received. The access information of the third server 530 may not be valid after a time designated as TTL. If the access information of the third server 530 is valid, it may mean that the access information is capable of performing a connection between the third server 530 and the electronic device 400 within a specified time. If the access information of the third server 530 is not valid, it may mean that the access information of the third server 530 is changed after a time designated by the TTL, so that connection between the third server 530 and the electronic device 400 cannot be performed.

According to various embodiments, in operation 1009, the EEC 503 may receive a connection request for a service using the third server 530 from an application (e.g., the application 505 in FIG. 5). When the application 505 is switched from an inactive state to an active state, the application 505 is first installed on the electronic device 400, or the application 505 is switched from the background state to the foreground state, a connection request for a service using the third server 530 may be transmitted to the EEC 503.

According to various embodiments, in operation 1011, the EEC 503 may check whether the access information of the third server 530 has expired. The EEC 503 may check whether the access information of the third server 530 has expired, based on the TTL information. If the difference between the current time and the time when the edge service discovery response message is received is less than the TTL value, the EEC 503 may determine that the access information of the third server 530 has not expired, and may perform a connection operation between the electronic device 400 and the third server 530 using the access information of the third server included in the edge service discovery response message. If the difference between the current time and the time when the edge service discovery response message is received is greater than (or exceeds) the TTL value, the EEC 503 may determine that the access information of the third server 530 has expired and the access information of the third server 530 is not valid.

According to various embodiments, when the access information of the plurality of third servers 530 is included in the edge service discovery response message, the EEC 503 may determine the validity of the access information of each of the plurality of third servers 530. The EEC 503 may update expired and invalid access information among access information of each of the plurality of third servers 530.

Referring to Table 12, the EEC 503 may each determine whether access information of the third server 530 having the EAS1 identifier has expired. Assuming that 120 seconds elapse from the time when the edge service discovery message illustrated in Table 12 is received, the EEC 503 may determine that the access information of the third server corresponding to EAS 1 is not valid, and the access information of the third server corresponding to EAS 2 is valid.

According to various embodiments, when the EEC 503 receives a connection request for a service using the third server 530 from the application 505, the EEC 503 may determine the validity of the access information of the third server 530. According to another embodiment, the EEC 503 may determine the validity of the access information of the third server 530 included in the edge service discovery response message every predetermined time.

According to various embodiments, in operation 1013, in response to checking that the access information of the third server 530 is not valid, the EEC 503 may transmit an edge service discovery request message for updating access information of the third server 530 to the second server 520.

Assuming that 120 seconds elapse from the time when the edge service discovery message illustrated in Table 12 is received, the EEC 503 may determine that the access information of the third server corresponding to EAS 1 is not valid, and may send an edge service discovery request message for requesting access information of the third server corresponding to EAS 1 to the second server 520. The edge service discovery request message transmitted in operation 1013 may further include information indicating a service that the application 505 can use. The edge service discovery request message transmitted in operation 1013 may be implemented, for example, in the form illustrated in Table 13.

TABLE 13

| | |
|---|---|
| Identifier of EEC 503 | 1000 |
| Access token of the second server 520 | 123456780 |
| Identifier (ACID) of an application 505 installed on the electronic device 400 | com.andriod.appl |
| Query filter | eas1 and/or app1.edge.com |

According to various embodiments, the second server 520 may receive the edge service discovery request message and check a service identifier (e.g., at least one of an identifier EASID of the third server 530, an identifier ACID of an application installed on the electronic device 400, and/or a domain address of the third server 530) for identifying an edge service included in the edge service discovery request message. The second server 520 may check access information of the third server 530 capable of providing a service corresponding to the service identifier.

According to various embodiments, in operation 1015, the second server 520 may transmit an edge service discovery response message including access information of the third server 530. The edge service discovery response message may include updated access information of the third server 530. The edge service discovery response message may be implemented in the form illustrated in Table 14. Referring to Table 14, it can be seen that the IP address of the endpoint of the third server is changed.

TABLE 14

| List of the third server | | Value |
|---|---|---|
| Identifier of the third server | | EASI |
| Assess address information of the third server | Domain name | app1.edge.com |
| | IP address | 4.4.4.4. |
| Identifier (ACID) of an application 505 installed on the electronic device 400 | | com.andriod.app1 |
| TTL(time to live) | | 60 |

According to various embodiments, in operation 1017, the EEC 503 may set a connection between the application 505 and the third server 530, based on access information of the third server 530 included in the edge service discovery response message.

According to various embodiments, in operation 1019, the application 505 may perform a service using the third server 530 by transmitting or receiving application data with the third server 530 connected in operation 1019.

Figure 11:
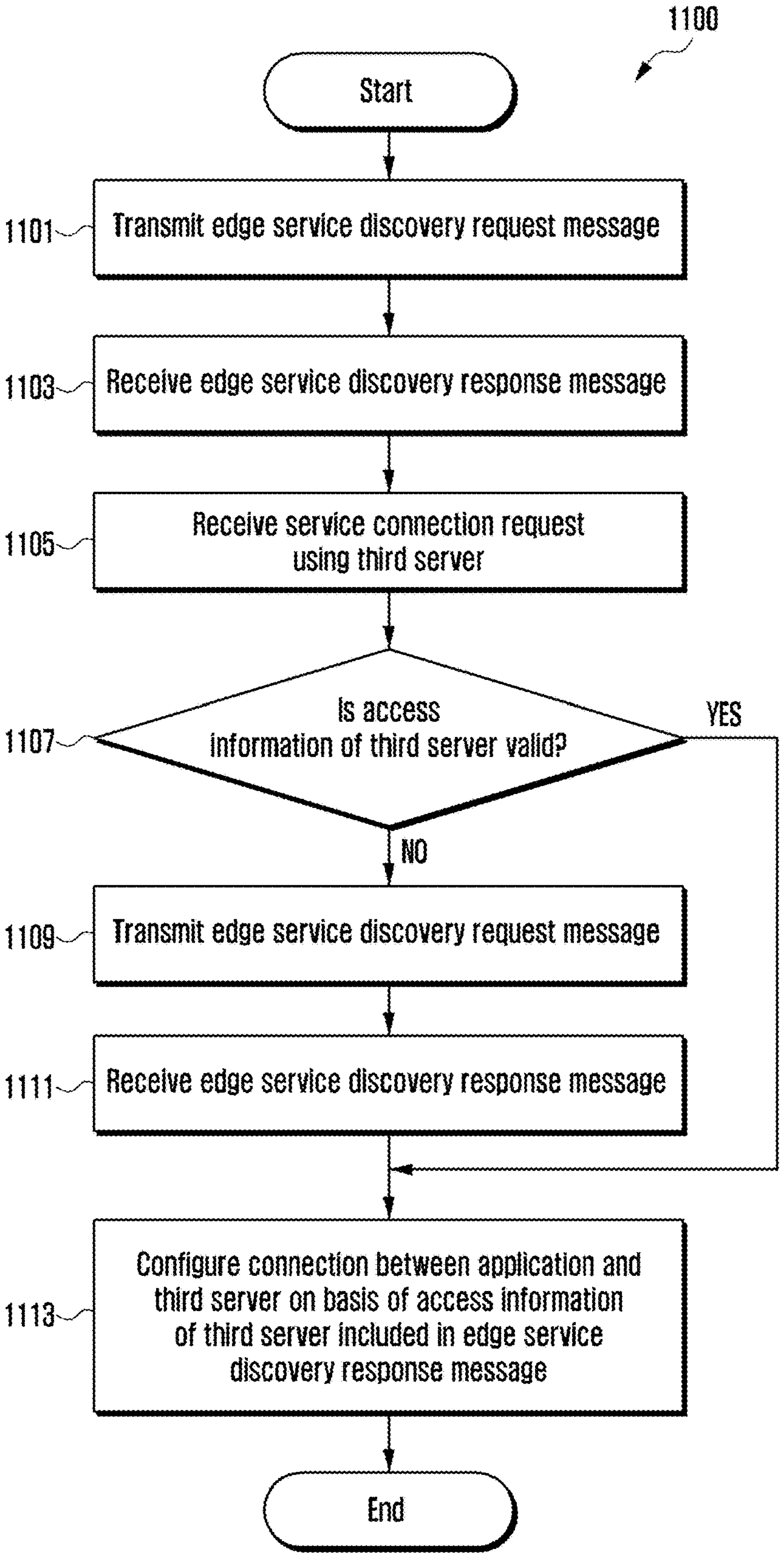
FIG. 11 illustrates a flowchart of an operation of transmitting an edge service discovery request message by an electronic device according to whether access information of a third server has expired, according to various embodiments.

FIG. 11 illustrates a flowchart of an operation of transmitting an edge service discovery request message by an electronic device according to whether access information of a third server has expired, according to various embodiments.

According to various embodiments, in operation 1101, a processor (e.g., the processor 501 in FIG. 5) of the electronic device (e.g., the electronic device 400 in FIG. 4) or an EEC (e.g., the EEC 503 in FIG. 5) executed on the processor 501 may transmit to the second server 520 an edge service discovery request message for requesting access information of the third server (e.g., the third server 530 in FIG. 5), based on the access information of the second server (e.g., the second server 520 in FIG. 5).

According to various embodiments, the discovery request message may include an identifier of the EEC 503, token information for authenticating access rights of the second server 520, and/or information indicating a discovery condition (e.g., the third server 530 or the identifier EAS ID of the third server 530 or the identifier ACID of an application installed on the electronic device 400 of the third server 530 connected to the second server 520.

According to various embodiments, in operation 1103, the processor 501 or the EEC 503 may receive an edge service discovery response message including at least part of the access information of the third server 530.

According to various embodiments, the edge service discovery response message may include access information of the two third servers 530. The access information of the third server 530 may include an identifier EASID of the third server 530, access information (e.g., the domain name FQDN of the third server 530, the IP address of the third server 530) of the third server 530, an identifier of an application installed on the electronic device 400 ACID, and TTL.

According to various embodiments, in operation 1105, the processor 501 or the EEC 503 may receive a service connection request using the third server 530 from an application (e.g., application 505 in FIG. 5).

According to various embodiments, in operation 1107, the processor 501 or the EEC 503 may check whether the access information of the third server 530 is valid.

According to various embodiments, the EEC 503 may check whether the access information of the third server 530 is valid, based on the TTL included in the access information of the third server 530. The TTL may refer to a valid time of access information of the third server 530. For example, the access information of the third server 530 may be valid within a time designated as TTL from the time when the edge service discovery response message is received. The access information of the third server 530 may not be valid after a time designated as TTL. If the access information of the third server 530 is valid, it may mean that the access information is capable of performing a connection between the third server 530 and the electronic device 400 within a specified time. If the access information of the third server 530 is not valid, it may mean that the access information of the third server 530 is changed after a time designated by the TTL, so that connection between the third server 530 and the electronic device 400 cannot be performed.

According to various embodiments, if the difference between the current time and the time when the edge service discovery response message is received is less than the TTL value, the EEC 503 may determine that the access information of the third server 530 has not expired (operation 1107-Y), and execute connection operation between the electronic device 400 and the third server 530 using the connection information of the third server 530 included in the edge service discovery response message in operation 1113. If the difference between the current time and the time when the edge service discovery response message is received is greater than (or exceeds) the TTL value, the EEC 503 may determine that the access information of the third server 530 has expired and the access information of the third server 530 is not valid.

According to various embodiments, in operation 1109, in response to checking that the access information of the third server 530 is not valid (operation 1107-N), the processor 501 or the EEC 503 may transmit an edge service discovery request message for updating access information of the third server 530 to the second server 520.

According to various embodiments, the edge service discovery request message transmitted in operation 1109 may further include information indicating a service that the application 505 can use.

According to various embodiments, the second server 520 may receive the edge service discovery request message and check a service identifier (e.g., at least one of an identifier EASID of the third server 530, an identifier ACID of an application installed on the electronic device 400, and/or a domain name FQDN) for identifying an edge service included in the edge service discovery request message. The second server 520 may check access information of the third server 530 capable of providing a service corresponding to the service identifier.

According to various embodiments, in operation 1111, the processor 501 or the EEC 503 may receive an edge service discovery response message from the second server 520.

According to various embodiments, the edge service discovery response message may include updated access information of the third server 530.

According to various embodiments, in operation 1113, the processor 501 or the EEC 503 may set a connection between the application 505 and the third server 530, based on the access information of the third server 530 included in the edge service discovery response message.

According to various embodiments, the application 505 may perform a service using the third server 530 by transmitting or receiving application data with the third server 530 connected in operation 1113.

The electronic device 400 determines the validity of the access information of the third server 530, and may receive valid access information of the third server 530 through a method of retransmitting the edge service discovery request message, and may implement the update of access information of the third server 530 through retransmission of the edge service discovery request message without a separate complicated operation.

An electronic device according to various embodiments may include a memory configured to store an application and/or an edge enabler client (EEC), a communication circuit for use in a communication connection between the electronic device and a first server, a second server, and/or a third server existing outside the electronic device through a base station, and a processor, wherein the application may be configured to perform one or more functions corresponding to an application that can be executed on the third server on the electronic device, and the processor may be configured to: receive access information of the second server for accessing the second server from the first server; receive access information of the third server from each of a plurality of second servers accessed based on the access information of the second server; check at least one or more third servers capable of providing the service, based on access information of the third server, in response to a service connection request using the third server of the application; select a third server to request access among the plurality of third servers, based on the priority of the plurality of second servers included in the access information of the second server, in response to checking that there are a plurality of third servers capable of providing the service; and perform the service using the selected third server.

In the electronic device according to various embodiments, the processor may be configured to select a third server included in the access information of the third server provided by a second server having the highest priority among the plurality of third servers.

In the electronic device according to various embodiments, the priority may be determined based on the performance information of the third server by the first server receiving the performance information of the third server from the second server.

In the electronic device according to various embodiments, the processor is configured to: check whether the performance information of the third server is included in the access information of the third server, in response to checking that the information on the priority of the second servers is not included in the access information of the second server; and select the third server to request access from among the plurality of third servers, based on the performance information of the third server.

In the electronic device according to various embodiments, the performance information of the third server may include performance information on available resources of the third server, and the processor may be configured to select a third server to request access from among the plurality of third servers, based on a weight assigned to each of the available resources.

In the electronic device according to various embodiments, the processor may be configured to change the weight, based on the service characteristic used by the application.

In the electronic device according to various embodiments, the processor may be configured to select a third server to request access from among the plurality of third servers, based on a state of a communication connection between the second server and the electronic device, in response to checking that the access information of the second server does not include information on the priorities of the second servers.

In the electronic device according to various embodiments, the processor may be configured to check a state of a communication connection between the second server and the electronic device, based on the difference between the time when the signal for requesting access information of the third server is transmitted and the time when the access information of the third server is received.

An electronic device according to various embodiments may include: a memory configured to store an application and/or an edge enabler client (EEC); a communication circuit for use in a communication connection between the electronic device and a first server, a second server, and/or a third server existing outside the electronic device through a base station; and a processor, wherein the application may be configured to perform one or more functions corresponding to an application that can be executed on the third server on the electronic device, and the processor may be configured to: receive access information of the second server for accessing the second server from the first server; transmit an edge service discovery request message requesting access information of the third server to the second server, based on the access information of the second server; receive an edge service discovery response message from the second server; check whether some of the information that is used for accessing the third server is present in the edge service discovery response message, in response to a service connection request using the third server of the application; and transmit a message for activating the third server to the second server in response to checking that some of the information that is used for accessing the third server does not exist in the edge service discovery response message.

In the electronic device according to various embodiments, the information that is used for accessing the third server may include at least one of an identifier of the application, a domain name of the third server, and an IP address of the third server.

In the electronic device according to various embodiments, as part of the operation of transmitting a message for activating the third server, the processor may be configured to transmit the edge service discovery request message to the second server.

In the electronic device according to various embodiments, the edge service discovery message may include at least one of an identifier of an application installed in the third server and information that is used for access to the third server among information included in the edge service discovery response message.

An electronic device according to various embodiments may include: a memory configured to store an application and/or an edge enabler client (EEC); a communication circuit for use in a communication connection between the electronic device and a first server, a second server, and/or a third server existing outside the electronic device through a base station; and a processor, wherein the application may be configured to perform one or more functions corresponding to an application that can be executed on the third server on the electronic device, and the processor may be configured to: receive access information of the second server for accessing the second server from the first server; transmit an edge service discovery request message requesting access information of the third server to the second server, based on the access information of the second server; receive access information of the third server from the second server; check whether the access information of the third server has expired, based on time to live (TTL) information included in the access information of the third server, in response to a service connection request using the third server of the application; and transmit the edge service discovery message back to the second server in response to checking that the access information of the third server has expired.

Figure 12:
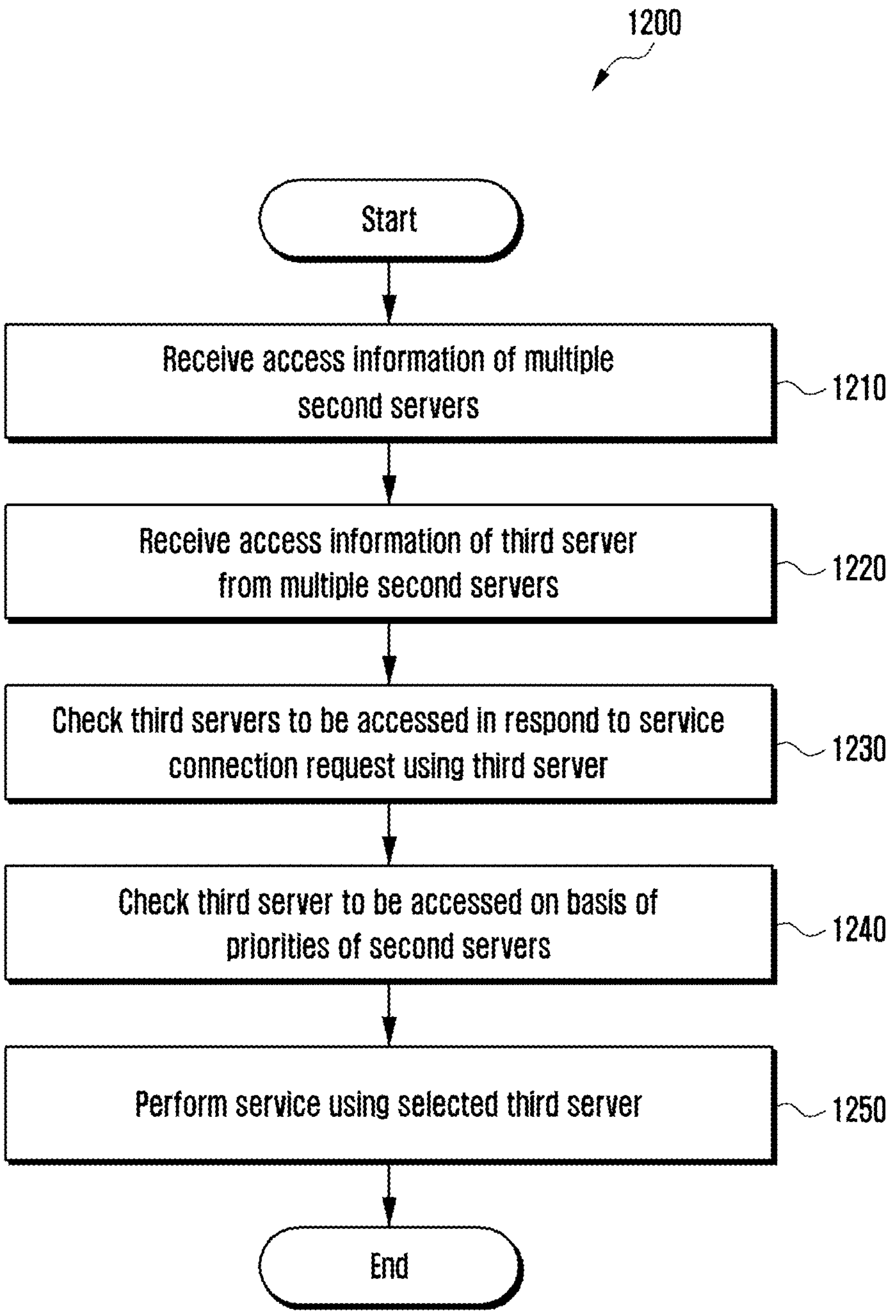
FIG. 12 illustrates a flowchart of a method of operating an electronic device according to various embodiments.

FIG. 12 illustrates a flowchart of a method of operating 1200 an electronic device according to various embodiments.

According to various embodiments, operations 1210 to 1250 may be performed by a processor (e.g., the processor 501 in FIG. 5) of the electronic device (e.g., the electronic device 400 in FIG. 4) or an EEC (e.g., EEC 503 in FIG. 5) executed on the processor 501.

According to various embodiments, in operation 1210, the electronic device (e.g., the electronic device 400 in FIG. 4) may receive access information of a plurality of second servers (e.g., the second server 520-*a* or 520-*b* in FIG. 6) from the first server (e.g., the first server 510 in FIG. 5).

According to various embodiments, the access information of the second server 520-*a* or 520-*b* may include at least one of an identifier of the second server 520-*a* or 520-*b*, IP address information of access address information of the second server 520-*a* or 520-*b*, domain information of the second server 520-*a* or 520-*b*, or URI information of the second server 520-*a* or 520-*b*.

According to various embodiments, the first server 510 may determine the priority of the second server 520-*a* or 520-*b* and transmit access information of the second server 520-*a* or 520-*b* including priority information to the EEC 503. The priority may refer to an order in which the electronic device 400 can first connect to a specific second server among the plurality of second servers 520-*a* or 520-*b*. Priorities may be assigned differently for each second server 520-*a* or 520-*b*.

According to various embodiments, the first server 510 may determine the priority of the plurality of second servers 520-*a* or 520-*b* according to a designated method (e.g., a contract relationship with a service provider).

According to various embodiments, the first server 510 may store designated priorities of the plurality of second servers 520-*a* or 520-*b*. For example, the priority of the plurality of second servers 520-*a* or 520-*b* may be specified based on a contractual relationship between the operator of the first server 510 and the operator of the plurality of second servers 520-*a* or 520-*b*. For example, among the plurality of third servers 530-*a* and 530-*b*, at least partially providing the same service, the operator of the second server 520-*a* connected to the third server 530-*a* may be different from the operator of the second server 520-*b* connected to the third server 530-*b*. The first server 510 may store the priority of each of the plurality of second servers 520-*a* and 520-*b* designated by the operator. For another example, the priority of each of the plurality of second servers 520-*a* and 520-*b* may be designated based on at least one of coverage or location of each of the second servers 520-*a* and 520-*b* and/or the third servers 530-*a* and 530-*b*. Priority may be specified in various ways except for the above-described embodiments. According to various embodiments, the second server 520 may check the performance information of the third server 530-*a* or 530-*b* through a designated method (e.g., periodically requesting transmission of the performance information to the third server 530-*a* or 530-*b*). The performance information of the third server 530-*a* or 530-*b* may mean performance information of various processing devices (e.g., CPU, NPU, memory, or GPU) allocated to the third server 530-*a* or 530-*b*. The second server 520-*a* or 520-*b* transmits the performance information of the third server 530-*a* or 530-*b* to the first server 510, and the first server 510 may determine the priority of the plurality of second servers 520-*a* or 520-*b*, based on the performance information of the third server 530-*a* or 530-*b* transmitted by the plurality of second servers 520-*a* or 520-*b*.

According to various embodiments, in operation 1220, the electronic device 400 may receive access information of at least one third server (e.g., third server 530-*a* or 530-*b* in FIG. 5) from the plurality of second servers 520-*a* or 520-*b*.

According to various embodiments, the access information of the third server 530-*a* or 530-*b* may include an identifier EASID of the third server 530-*a* or 530-*b*, an identifier ACID of the application 505 installed on the electronic device 400, and/or access address information (e.g., IP address of third server 530-*a* or 530-*b*, domain name of third server 530-*a* or 530-*b*) of the third server 530-*a* or 530-*b*.

According to various embodiments, the access information of the third server 530-*a* or 530-*b* may further include performance information of the third server 530-*a* or 530-*b*. The second server 520-*a* or 520-*b* may check the performance information of the third server 530-*a* or 530-*b* through a designated method (e.g., a method of periodically requesting transmission of performance information to a third server 530-*a* or 530-*b*). The second server 520-*a* or 520-*b* may transmit an edge service discovery response message including performance information of the identified third server 530-*a* or 530-*b* to the EEC 503. When the access information of the second server does not include priority information of the second server 520, the EEC 503 may select the third server 530-*a* or 530-*b* to be connected, based on the performance information of the third server 530-*a* or 530-*b* included in the access information of the third server 530-*a* or 530-*b*.

According to various embodiments, in operation 1230, the electronic device 400 may identify third servers 530-*a* or 530-*b* capable of performing a service in response to a service connection request using the third server 530-*a* or 530-*b*.

According to various embodiments, in operation 1240, the electronic device 400 may select the third server 530-*a* or 530-*b* to access, based on the priority of the second server 520-*a* or 520-*b*.

According to various embodiments, the EEC 503 may check whether priority information of each of the second servers 520-*a* or 520-*b* exists in the access information of the second server 520-*a* or 520-*b* received from the first server 510. In response to checking that the priority information exists in the access information of the second server 520-*a* or 520-*b*, the EEC 503 may select the third server 530-*a* or 530-*b* to be connected, based on the priority information. For example, the EEC 503 may select a third server 530-*a* or 530-*b* connected to the second server 520-*a* or 520-*b* having the highest priority among the plurality of second servers 520-*a* or 520-*b* as a server to be connected.

According to various embodiments, in operation 1250, the electronic device 400 may execute a service using the selected third server 530-*a* or 530-*b*.

A method of operating an electronic device according to various embodiments may include: receiving access information of a second server for accessing a second server from the first server; receiving access information of a third server from each of a plurality of second servers accessed, based on the access information of the second server; checking at least one third server capable of providing the service, based on the access information of the third server, in response to the service connection request using the third server of the application; selecting a third server to request access among the plurality of third servers, based on the priority of the plurality of second servers included in the access information of the second server, in response to checking that there are a plurality of third servers capable of providing the service; and performing the service using the selected third server.

In the method of operating the electronic device according to various embodiments, the operation of selecting the third server may include selecting a third server included in the access information of the third server provided by a second server having the highest priority among the plurality of third servers.

In the method of operating the electronic device according to various embodiments, the priority may include the priority determined based on performance information of the third server by the first server receiving the performance information of the third server from the second server.

In the method of operating the electronic device according to various embodiments, the operation of selecting the third server may include checking whether the performance information of the third server is included in the access information of the third server, in response to checking that the information on the priority of the second servers is not included in the access information of the second server, and selecting the third server to request access from among the plurality of third servers, based on the performance information of the third server.

In the method of operating the electronic device according to various embodiments, the performance information of the third server may include performance information on available resources of the third server, and the selecting the third server may further include selecting the third server to request access from among the plurality of third servers, based on a weight assigned to each of the available resources.

The method of operating the electronic device according to various embodiments may further include changing the weight, based on the service characteristic used by the application.

The method of operating the electronic device according to various embodiments may further include selecting the third server to request access from among the plurality of third servers, based on a state of a communication connection between the second server and the electronic device, in response to checking that the access information of the second server does not include information on the priorities of the second servers.

The method of operating the electronic device according to various embodiments may further include checking a state of a communication connection between the second server and the electronic device, based on the difference between the time when the signal for requesting access information of the third server is transmitted and the time when the access information of the third server is received.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:

a communication circuit configured to communicate with at least one of a first server, a second server, and a third server existing outside the electronic device through a base station;

a memory configured to store an application and an edge enabler client (EEC), wherein the application is configured to perform one or more functions corresponding to the third server; and a processor configured to:

receive access information of each of a plurality of second servers for accessing the second server from the first server, wherein the access information of each of the plurality of second servers including a priority of each of the plurality of the second servers and the priority of each of the plurality of second servers is determined based on a capability information of the third server connected to each of the plurality of the second servers;

receive access information of the third server from each of the plurality of second servers accessed based on the access information of the second server;

identify at least one or more third servers capable of providing a service, based on the access information of the third server, in response to a service connection request using the third server from the application;

select the third server to request access among a plurality of third servers, based on the priority of the plurality of second servers included in the access information of the second server, in response to identifying that third servers capable of providing the service are discovered; and perform the service using the selected third server.

2. The electronic device of claim 1, wherein the processor is further configured to select the third server that is included in the access information of the third server provided by the second server, wherein the selected third server is a highest priority among the plurality of third servers.

3. The electronic device of claim 1, wherein the priority is determined based on capability information of the third server by the first server that received the capability information of the third server from the second server.

4. The electronic device of claim 1, wherein the processor is further configured to:

identify whether capability information of the third server is included in the access information of the third server, in response to identifying that the priority of the plurality of second servers is not included in the access information of the second server, and select the third server to request access from among the plurality of third servers, based on the capability information of the third server.

5. The electronic device of claim 4, wherein:

the capability information of the third server includes capability information on available resources of the third server, and the processor is further configured to select the third server to request access from among the plurality of third servers, based on a weight assigned to each of the available resources.

6. The electronic device of claim 5, wherein the processor is further configured to change the weight, based on a service characteristic used by the application.

7. The electronic device of claim 1, wherein the processor is further configured to select the third server to request access from among the plurality of third servers, based on a state of a communication connection between the second server and the electronic device, in response to identifying that the access information of the second server does not include information on the priority of the second server.

8. The electronic device of claim 7, wherein the processor is further configured to identifying a state of the communication connection between the second server and the electronic device, based on a difference between a time when a signal for requesting access information of the third server is transmitted and a time when the access information of the third server is received.

9. A method of operating an electronic device, the method comprising:

receiving access information of each of a plurality of second servers for accessing the second server from a first server, wherein the access information of each of the plurality of the second servers including a priority of each of the plurality of the second servers and the priority of each of the plurality of the second servers is determined based on a capability information of a third server connected to each of the plurality of the second servers;

receiving access information of the third server from each of the plurality of the second servers accessed based on the access information of the second server;

identifying at least one third server capable of providing a service, based on the access information of the third server, in response to a service connection request using the third server from an application of the electronic device;

selecting the third server to request access among a plurality of third servers, based on the priority of the plurality of second servers included in the access information of the second server, in response to identifying that third servers capable of providing the service are discovered; and performing the service using the selected third server.

10. The method of claim 9, wherein the selecting the third server includes selecting the third server that is included in the access information of the third server provided by the second server, wherein the selected third server is a highest priority among the plurality of third servers.

11. The method of claim 9, wherein the priority includes the priority determined based on capability information of the third server by the first server that received the capability information of the third server from the second server.

12. The method of claim 9, wherein the selecting the third server includes:

identifying whether capability information of the third server is included in the access information of the third server, in response to identifying that the priority of the plurality of second servers is not included in the access information of the second server; and selecting the third server to request access from among the plurality of third servers, based on the capability information of the third server.

13. The method of claim 12, wherein:

the capability information of the third server includes capability information on available resources of the third server, and the selecting the third server further includes selecting the third server to request access from among the plurality of third servers, based on a weight assigned to each of the available resources.

14. The method of claim 13, further comprising changing the weight, based on a service characteristic used by the application.

15. The method of claim 9, further comprising selecting the third server to request access from among the plurality of third servers, based on a state of a communication connection between the second server and the electronic device, in response to identifying that the access information of the second server does not include information on the priority of the second server.

16. The method of claim 15, further comprising identifying a state of the communication connection between the second server and the electronic device, based on a difference between a time when a signal for requesting access information of the third server is transmitted and a time when the access information of the third server is received.

17. A non-transitory computer-readable storage medium comprising instructions for controlling an operation of an electronic device, the instructions configured to, when executed by a processor of the electronic device, cause the processor to:

receive access information of each of a plurality of second servers for accessing the second server from a first server, wherein the access information of each of the plurality of the second servers including a priority of each of the plurality of the second servers and the priority of each of the plurality of the second servers is determined based on a capability information of a third server connected to each of the plurality of the second servers;

receive access information of the third server from each of the plurality of the second servers accessed based on the access information of the second server;

identifying at least one third server capable of providing a service, based on the access information of the third server, in response to a service connection request using the third server from an application of the electronic device;

select the third server to request access among a plurality of third servers, based on the priority of the plurality of second servers included in the access information of the second server, in response to identifying that third servers capable of providing the service are discovered; and perform the service using the selected third server.

18. The non-transitory computer-readable storage medium of claim 17, wherein to select the third server includes selecting the third server that is included in the access information of the third server provided by the second server, wherein the selected third server is a highest priority among the plurality of third servers.

19. The non-transitory computer-readable storage medium of claim 17, wherein the priority includes the priority determined based on capability information of the third server by the first server that received the capability information of the third server from the second server.

20. The non-transitory computer-readable storage medium of claim 17, wherein the that instructions, when executed by a processor of an electronic device, further cause the processor to:

identify whether capability information of the third server is included in the access information of the third server, in response to identifying that the priority of the plurality of second servers is not included in the access information of the second server; and select the third server to request access from among the plurality of third servers, based on the capability information of the third server.

* * * * *